US011265900B2

(12) United States Patent
Hao et al.

(10) Patent No.: US 11,265,900 B2
(45) Date of Patent: Mar. 1, 2022

(54) PARTIAL BAND CONFIGURATION FOR CHANNEL STATE INFORMATION

(71) Applicant: Qualcomm Incorporated, San Diego, CA (US)

(72) Inventors: Chenxi Hao, Beijing (CN); Yu Zhang, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/610,989

(22) PCT Filed: Aug. 11, 2017

(86) PCT No.: PCT/CN2017/097102
§ 371 (c)(1),
(2) Date: Nov. 5, 2019

(87) PCT Pub. No.: WO2018/201640
PCT Pub. Date: Nov. 8, 2018

(65) Prior Publication Data
US 2020/0084787 A1    Mar. 12, 2020

(30) Foreign Application Priority Data

May 5, 2017 (WO) ................ PCT/CN2017/083251

(51) Int. Cl.
*H04W 72/12* (2009.01)
*H04B 7/06* (2006.01)
*H04L 5/00* (2006.01)

(52) U.S. Cl.
CPC ...... *H04W 72/1273* (2013.01); *H04B 7/0632* (2013.01); *H04B 7/0634* (2013.01); *H04L 5/0051* (2013.01)

(58) Field of Classification Search
CPC ............ H04W 72/1273; H04W 72/044; H04B 7/0632; H04B 7/0634; H04B 7/0456;
(Continued)

(56) References Cited

U.S. PATENT DOCUMENTS

2008/0232494 A1   9/2008  Pan et al.
2010/0124297 A1   5/2010  Papasakellariou et al.
(Continued)

FOREIGN PATENT DOCUMENTS

CN    103391154 A    11/2013
CN    106559182 A    4/2017
(Continued)

OTHER PUBLICATIONS

International Search Report and Written Opinion—PCT/CN2017/083251—ISA/EPO—dated Jan. 26, 2018.
(Continued)

*Primary Examiner* — Peter P Chau
(74) *Attorney, Agent, or Firm* — Timothy R. Hirzel

(57) ABSTRACT

Methods, systems, and devices for wireless communication are described that provide for the utilization of multiple partial bands used in the transmission of one or more channel state information (CSI) reference signals (CSI-RSs). The partial bands may be non-consecutive in the frequency domain, time domain, or a combination thereof and each of which may be precoder using a different precoder configuration. The time intervals, cycling granularity, and number of ports may vary between partial bands. Using RSs transmitted via the multiple partial bands, a user equipment (UE) may determine a channel state parameter for each partial band, which may be used for channel feedback.

28 Claims, 14 Drawing Sheets

(58) Field of Classification Search
CPC ............... H04L 5/0051; H04L 25/0204; H04L 25/0224; H04L 5/005; H04L 5/0007; H04L 5/0044; H04L 5/0048
See application file for complete search history.

(56) References Cited

U.S. PATENT DOCUMENTS

| | | | |
|---|---|---|---|
| 2012/0106374 A1* | 5/2012 | Gaal | H04L 5/0048 370/252 |
| 2012/0176939 A1 | 7/2012 | Qu et al. | |
| 2013/0286964 A1* | 10/2013 | Chu | H04L 5/0035 370/329 |
| 2014/0064109 A1 | 3/2014 | Krishnamurthy et al. | |
| 2017/0063436 A1* | 3/2017 | Li | H04W 24/10 |
| 2019/0342782 A1* | 11/2019 | Yum | H04W 24/10 |
| 2020/0067631 A1* | 2/2020 | Kakishima | H04L 5/0051 |

FOREIGN PATENT DOCUMENTS

| | | |
|---|---|---|
| EP | 2603031 A1 | 6/2013 |
| WO | WO-2011083417 A2 | 7/2011 |
| WO | WO-2013020565 A1 | 2/2013 |
| WO | WO 2014117604 A1 | 8/2014 |
| WO | WO-2015101109 A1 | 7/2015 |

OTHER PUBLICATIONS

International Search Report and Written Opinion—PCT/CN2017/097102—ISA/EPO—dated Jan. 29, 2018.
Intel Corporation: "Discussion on CSI Feedback for NR", 3GPP TSG-RAN WG1 #86, R1-167129, Discussion on CSI Feedback for NR R4, 3RD Generation Partnership Project (3GPP), Mobile Competence Centre, 650, Route Des Lucioles, F-06921, Sophia-Antipolis Cedex, France, vol. RAN WG1, No. Gothenburg, Sweden, Aug. 22, 2016-Aug. 26, 2016, 2016, Aug. 21, 2016 (Aug. 21, 2016), XP051140544, 3 pages, Retrieved from the Internet: URL: http://www.3gpp.org/ftp/Meetings_3GPP_SYNC/RAN1/Docs/ [retrieved on Aug. 21, 2016], section 3.
Supplementary European Search Report—EP17908661—Search Authority—The Hague—dated Nov. 17, 2020.
Taiwan Search Report—TW107112544—TIPO—dated Oct. 30, 2021.

* cited by examiner

PARTIAL BAND CONFIGURATION FOR CHANNEL STATE INFORMATION

CROSS REFERENCE

This present Application is a 371 national phase filing of International Patent Application No. PCT/CN2017/097102 by Hao et al., entitled "PARTIAL BAND CONFIGURATION FOR CHANNEL STATE INFORMATION," filed Aug. 11, 2017, which claims priority to International Patent Application No. PCT/CN2017/083251 by Hao et al., entitled "PARTIAL BAND CONFIGURATION FOR CHANNEL STATE INFORMATION," filed May 5, 2017, each of which is assigned to the assignee hereof, and hereby incorporated by reference in their entirety.

BACKGROUND

The following relates generally to wireless communication, and more specifically to partial band configuration for channel state information (CSI).

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems (e.g., a Long Term Evolution (LTE) system, or a New Radio (NR) system). A wireless multiple-access communications system may include a number of base stations or access network nodes, each simultaneously supporting communication for multiple communication devices, which may be otherwise known as user equipment (UE).

In some wireless communications systems, a base station may utilize a number of precoders for transmitting signals to the UE. These precoders may vary across frequency tones or resource blocks (RBs). For instance, the base station may utilize a first precoder for a first set of RBs (e.g., even numbered RBs) within a slot and a second precoder for a second set of RBs (e.g., odd numbered RBs) within the slot. The use of different precoders across RBs within a given frequency bandwidth may make it difficult to perform an accurate channel estimation across the entire bandwidth. Without an accurate channel estimation, the quality of channel feedback reports from the UE may be degraded, which may negatively affect system performance.

SUMMARY

The described techniques relate to improved methods, systems, devices, or apparatuses that support partial band configuration for channel state information (CSI). Generally, the described techniques provide for the utilization of a partial band configuration for transmission of one or more CSI reference signals (CSI-RSs). Multiple partial bands may be configured for transmission of the CSI-RSs and may be non-consecutive in the frequency domain, time domain, or combination thereof such that each partial band includes a set of frequency, time, or time-frequency resources that do not overlap with frequency, time, or time-frequency resources of another partial band. Each partial band may include a set of resource blocks (RBs) and may span a given time interval which may vary with respect to other partial bands. The precoding configuration, cycling granularity, number of partial bands, and number of antenna ports may also vary between partial bands.

A method of wireless communication is described. The method may include identifying a CSI-RS resource set with one CSI-RS resource for transmission of multiple CSI-RSs to a user equipment (UE), precoding, according to a first partial band configuration, a first CSI-RS for transmission over a first resource subset of the CSI-RS resource associated with the first non-consecutive partial band, precoding, according to a second partial band configuration, a second CSI-RS for transmission over a second resource subset of the CSI-RS resource associated with the second non-consecutive partial band, and transmitting, to the UE, the precoded first CSI-RS over the first resource subset and the precoded second CSI-RS over the second resource subset.

An apparatus for wireless communication is described. The apparatus may include means for identifying a CSI-RS resource set with one CSI-RS resource for transmission of multiple CSI-RSs to a UE, means for precoding, according to a first partial band configuration, a first CSI-RS for transmission over a first resource subset of the CSI-RS resource associated with the first non-consecutive partial band, means for precoding, according to a second partial band configuration, a second CSI-RS for transmission over a second resource subset of the CSI-RS resource associated with the second non-consecutive partial band, and means for transmitting, to the UE, the precoded first CSI-RS over the first resource subset and the precoded second CSI-RS over the second resource subset.

Another apparatus for wireless communication is described. The apparatus may include a processor, memory in electronic communication with the processor, and instructions stored in the memory. The instructions may be operable to cause the processor to identify a CSI-RS resource set with one CSI-RS resource for transmission of multiple CSI-RSs to a UE, precode, according to a first partial band configuration, a first CSI-RS for transmission over a first resource subset of the CSI-RS resource associated with the first non-consecutive partial band, precode, according to a second partial band configuration, a second CSI-RS for transmission over a second resource subset of the CSI-RS resource associated with the second non-consecutive partial band, and transmit, to the UE, the precoded first CSI-RS over the first resource subset and the precoded second CSI-RS over the second resource subset.

A non-transitory computer readable medium for wireless communication is described. The non-transitory computer-readable medium may include instructions operable to cause a processor to identify a CSI-RS resource set with one CSI-RS resource for transmission of multiple CSI-RSs to a UE, precode, according to a first partial band configuration, a first CSI-RS for transmission over a first resource subset of the CSI-RS resource associated with the first non-consecutive partial band, precode, according to a second partial band configuration, a second CSI-RS for transmission over a second resource subset of the CSI-RS resource associated with the second non-consecutive partial band, and transmit, to the UE, the precoded first CSI-RS over the first resource subset and the precoded second CSI-RS over the second resource subset.

In some examples of the method, apparatus, and non-transitory computer-readable medium described above, the CSI-RS resource may be partitioned according to at least a first non-consecutive partial band and a second non-consecutive partial band in a frequency domain, or time domain, or a combination thereof.

In some examples of the method, apparatus, and non-transitory computer-readable medium described above, the first CSI-RS may be precoded according to a first precoder configuration, and the second CSI-RS may be precoded according to a second precoder configuration.

Some examples of the method, apparatus, and non-transitory computer-readable medium described above may further include processes, features, means, or instructions for identifying a total number of precoder configurations for transmission of the multiple CSI-RSs, where the CSI-RS resource may be partitioned into a plurality non-consecutive partial bands based on the total number of precoder configurations.

Some examples of the method, apparatus, and non-transitory computer-readable medium described above may further include processes, features, means, or instructions for receiving a channel feedback message from the UE, where the channel feedback message may be computed based on one or both of the first precoded CSI-RS and the second precoded CSI-RS.

In some examples of the method, apparatus, and non-transitory computer-readable medium described above, the channel feedback message may indicate at least one of a precoding matrix indicator, a precoding type indicator, a rank indicator, a channel quality indicator, or a combination thereof.

In some examples of the method, apparatus, and non-transitory computer-readable medium described above, the transmission of the precoded first CSI-RS over the first resource subset of the CSI-RS resource associated with the first non-consecutive partial band may occur at a different time than or at a same time as the transmission of the precoded second CSI-RS over the second resource subset of the CSI-RS resource associated with the second non-consecutive partial band.

In some examples of the method, apparatus, and non-transitory computer-readable medium described above, the first resource subset may span a time interval different from or the same as the second resource subset.

In some examples of the method, apparatus, and non-transitory computer-readable medium described above, a first cycling granularity for precoding the first CSI-RS for the first non-consecutive partial band may be equal to or different from a second cycling granularity for precoding the second CSI-RS for the second non-consecutive partial band.

In some examples of the method, apparatus, and non-transitory computer-readable medium described above, the first cycling granularity may be a parameter of the first partial band configuration, and the second cycling granularity may be a parameter of the second partial band configuration.

In some examples of the method, apparatus, and non-transitory computer-readable medium described above, transmitting the precoded first CSI-RS over the first resource subset may include transmitting the precoded first CSI-RS using a part or all of the antenna ports in a set of antenna ports.

In some examples of the method, apparatus, and non-transitory computer-readable medium described above, transmitting the precoded second CSI-RS over the second resource subset may include transmitting the precoded second CSI-RS using a part or all the antenna ports in the set of antenna ports.

Some examples of the method, apparatus, and non-transitory computer-readable medium described above may further include processes, features, means, or instructions for configuring the CSI-RS resource set with multiple CSI-RS resources, where each CSI-RS resource may be partitioned according to at least a first non-consecutive partial band and a second non-consecutive partial band.

In some examples of the method, apparatus, and non-transitory computer-readable medium described above, at least two CSI-RS resources may be different by at least a number of partial bands, a time duration for each partial band, a cycling granularity for each partial band, a number of CSI-RS ports for each partial band, precoder used for each partial band, or any combination thereof.

Some examples of the method, apparatus, and non-transitory computer-readable medium described above may further include processes, features, means, or instructions for transmitting a CSI-RS resource set configuration to the UE, where the CSI-RS resource set configuration includes at least one of a number of CSI-RS resources of the CSI-RS resource set, a number of partial bands in each CSI-RS resource, a time duration for each partial band, a cycling granularity for each partial band, a number of CSI-RS ports for each partial band, or a combination thereof.

In some examples of the method, apparatus, and non-transitory computer-readable medium described above, the configuration may be included in a radio resource control (RRC) message, medium access control (MAC) channel element (CE), or in downlink control information (DCI).

In some examples of the method, apparatus, and non-transitory computer-readable medium described above, the channel feedback message may indicate at least one of one or more CSI-RS resource indication (CRI), a precoding matrix indicator, a precoding type indicator, a rank indicator, a channel quality indicator, or a combination thereof.

In some examples of the method, apparatus, and non-transitory computer-readable medium described above, the transmission the first partial band configuration and the second partial band configuration may be individually or jointly encoded in DCI.

In some examples of the method, apparatus, and non-transitory computer-readable medium described above, a format of the DCI may correspond to one of a special DCI format or a CSI-RS DCI format.

In some examples of the method, apparatus, and non-transitory computer-readable medium described above, the DCI may be one of UE-specific or group-specific.

Some examples of the method, apparatus, and non-transitory computer-readable medium described above may further include processes, features, means, or instructions for receiving a channel feedback message from the UE, where the channel feedback message may be computed based on at least one of the CSI-RS resources of the CSI-RS resource set.

A method of wireless communication is described. The method may include receiving, from a base station, a first CSI-RS over a first resource subset of a CSI-RS resource associated with a first non-consecutive partial band, where the first CSI-RS is precoded according to a first partial band configuration, receiving a second CSI-RS over a second resource subset of the CSI-RS resource associated with a second non-consecutive partial band, where the second CSI-RS is precoded according to a second partial band configuration, determining, based on the first and second CSI-RSs, a channel state parameter based on the first non-consecutive partial band and the second non-consecutive partial band, and transmitting, to the base station, a feedback message that indicates the channel state parameter.

An apparatus for wireless communication is described. The apparatus may include means for receiving, from a base station, a first CSI-RS over a first resource subset of a CSI-RS resource associated with a first non-consecutive partial band, where the first CSI-RS is precoded according to a first partial band configuration, means for receiving a second CSI-RS over a second resource subset of the CSI-RS resource associated with a second non-consecutive partial band, where the second CSI-RS is precoded according to a second partial band configuration, means for determining, based on the first and second CSI-RSs, a channel state parameter based on the first non-consecutive partial band and the second non-consecutive partial band, and means for transmitting, to the base station, a feedback message that indicates the channel state parameter.

Another apparatus for wireless communication is described. The apparatus may include a processor, memory in electronic communication with the processor, and instructions stored in the memory. The instructions may be operable to cause the processor to receive, from a base station, a first CSI-RS over a first resource subset of a CSI-RS resource associated with a first non-consecutive partial band, where the first CSI-RS is precoded according to a first partial band configuration, receive a second CSI-RS over a second resource subset of the CSI-RS resource associated with a second non-consecutive partial band, where the second CSI-RS is precoded according to a second partial band configuration, determine, based on the first and second CSI-RSs, a channel state parameter based on the first non-consecutive partial band and the second non-consecutive partial band, and transmit, to the base station, a feedback message that indicates the channel state parameter.

A non-transitory computer readable medium for wireless communication is described. The non-transitory computer-readable medium may include instructions operable to cause a processor to receive, from a base station, a first CSI-RS over a first resource subset of a CSI-RS resource associated with a first non-consecutive partial band, where the first CSI-RS is precoded according to a first partial band configuration, receive a second CSI-RS over a second resource subset of the CSI-RS resource associated with a second non-consecutive partial band, where the second CSI-RS is precoded according to a second partial band configuration, determine, based on the first and second CSI-RSs, a channel state parameter based on the first non-consecutive partial band and the second non-consecutive partial band, and transmit, to the base station, a feedback message that indicates the channel state parameter.

In some examples of the method, apparatus, and non-transitory computer-readable medium described above, determining the channel state parameter may include determining one or more channel state parameters for the CSI-RS resource corresponding to the first and second non-consecutive partial bands based on a channel estimation of the first and second non-consecutive partial bands.

Some examples of the method, apparatus, and non-transitory computer-readable medium described above may further include processes, features, means, or instructions for receiving, from the base station, an indication of one or both of the first partial band configuration or the second partial band configuration.

In some examples of the method, apparatus, and non-transitory computer-readable medium described above, the indication may be received via an RRC message, MAC CE, or DCI.

In some examples of the method, apparatus, and non-transitory computer-readable medium described above, the first precoder configuration may indicate at least one of the first resource subset, a first cycling granularity for the first non-consecutive partial band, a first time interval for the first CSI-RS, a first number of ports associated with transmission of the first CSI-RS, or a combination thereof. In some examples of the method, apparatus, and non-transitory computer-readable medium described above, the second precoder configuration may indicate at least one of the second resource subset, a second cycling granularity for the second non-consecutive partial band, a second time interval for the second CSI-RS, a second number of ports associated with transmission of the second CSI-RS, or a combination thereof.

In some examples of the method, apparatus, and non-transitory computer-readable medium described above, the first cycling granularity may indicate a number of consecutive RBs in a frequency domain, time domain, or a combination thereof of the first resource subset. In some examples of the method, apparatus, and non-transitory computer-readable medium described above, the second cycling granularity may indicate a number of consecutive RBs in a frequency domain, a time domain, or a combination thereof of the second resource subset.

Some examples of the method, apparatus, and non-transitory computer-readable medium described above may further include processes, features, means, or instructions for estimating a first effective channel for the first non-consecutive partial band based on a first set of RBs of the first resource subset. Some examples of the method, apparatus, and non-transitory computer-readable medium described above may further include processes, features, means, or instructions for estimating a second effective channel for the second non-consecutive partial band based on a second set of RBs of the second resource subset, where the second non-consecutive partial band includes a non-consecutive partial band from the first non-consecutive partial band in a frequency domain, time domain, or a combination thereof.

Some examples of the method, apparatus, and non-transitory computer-readable medium described above may further include processes, features, means, or instructions for selecting a CRI based on the first and second effective channels, where the channel state parameter may be determined based on the CRI.

In some examples of the method, apparatus, and non-transitory computer-readable medium described above, the channel state parameter may include at least one of a precoding matrix indicator, a precoding type indicator, a rank indicator, a channel quality indicator, or a combination thereof.

In some examples of the method, apparatus, and non-transitory computer-readable medium described above, one or both of the first and second CSI-RS port to data precoder mappings may be based in part on a co-phase vector or Alamouti encoding associated with a set of resource elements (REs) corresponding to a respective resource subset of the first resource subset and the second resource subset.

Some examples of the method, apparatus, and non-transitory computer-readable medium described above may further include processes, features, means, or instructions for receiving, from the base station, a control message indicating that the first partial band configuration and the second partial band configuration may have different configuration parameters.

In some examples of the method, apparatus, and non-transitory computer-readable medium described above, at least one configuration parameter of the first partial band configuration or the second partial band configuration may be received in an RRC message, MAC CE, or in DCI.

In some examples of the method, apparatus, and non-transitory computer-readable medium described above, the CSI-RS resource may include one CSI-RS resource of a CSI-RS resource set.

Some examples of the method, apparatus, and non-transitory computer-readable medium described above may further include processes, features, means, or instructions for receiving, from the base station, multiple CSI-RS resources from the CSI-RS resource set, where each CSI-RS resource may be partitioned according to at least a first non-consecutive partial band and a second non-consecutive partial band.

In some examples of the method, apparatus, and non-transitory computer-readable medium described above, at least two CSI-RS resources may be different by at least a number of partial bands, a time duration for each partial band, a cycling granularity for each partial band, a number of CSI-RS ports for each partial band, precoder used for each partial band, or any combination thereof.

Some examples of the method, apparatus, and non-transitory computer-readable medium described above may further include processes, features, means, or instructions for receiving, from the base station, a CSI-RS resource set configuration, where the CSI-RS resource set configuration includes at least one of a number of CSI-RS resources of the CSI-RS resource set, a number of partial bands in each CSI-RS resource, a time duration for each partial band, a cycling granularity for each partial band, a number of CSI-RS ports for each partial band, or a combination thereof.

In some examples of the method, apparatus, and non-transitory computer-readable medium described above, the configuration may be included in a RRC message, MAC CE, or in DCI.

DETAILED DESCRIPTION

A base station in a wireless communications system may transmit reference signals (RSs) to a user equipment (UE) or a group of UEs. One such reference signal is a channel state information (CSI) RS (CSI-RS), which may be used by a UE to determine channel conditions or estimate an effective channel used for communication with the base station. In some cases, the base station may precode sets of frequency resources in a given time slot using different precoding configurations for transmission of one or more CSI-RSs. This use of different precoding configurations may complicate the process of obtaining an accurate wideband channel quality across the frequency bandwidth used for transmission.

Techniques described herein may employ the use of multiple partial bands for transmission of one or more CSI-RSs. A partial band may refer to a subset of frequency tones within a carrier or channel (e.g., as defined in the frequency domain by a set of resource blocks). A non-sequential or non-consecutive partial band may refer to a partial band defined by a set of resource blocks of a carrier or channel that are non-contiguous. The partial bands may be non-contiguous or non-consecutive in the frequency domain, time domain, or a combination thereof, and may be configured by a base station or other network entity. A partial band configuration may refer to a set of parameters, such as cycling granularity, time duration, and resources, defined for a partial band. Each of the multiple partial bands may be associated with a different partial band configuration. In some instances, at least some parameters of the parameters of a partial band configuration may be the same for two or more different partial bands. The base station may utilize the multiple partial bands to transmit one or more CSI-RSs to a UE. After receiving the one or more CSI-RSs, the UE may determine a channel state parameter such as channel quality indicator (CQI), rank indicator (RI), CSI resource indicator (CRT), among others for each of the one or more CSI-RSs. The channel state parameter may then be transmitted to the base station in a feedback message. In some cases, the channel state parameter for each partial band may be averaged and the average channel state parameter may be reported to the base station. Such techniques may allow for a more accurate wideband channel estimation.

Aspects of the disclosure are initially described in the context of a wireless communications system. Aspects are then described with RS schemes and process flows. Aspects of the disclosure are further illustrated by and described with reference to apparatus diagrams, system diagrams, and flowcharts that relate to partial band configuration for CSI.

Figure 1:
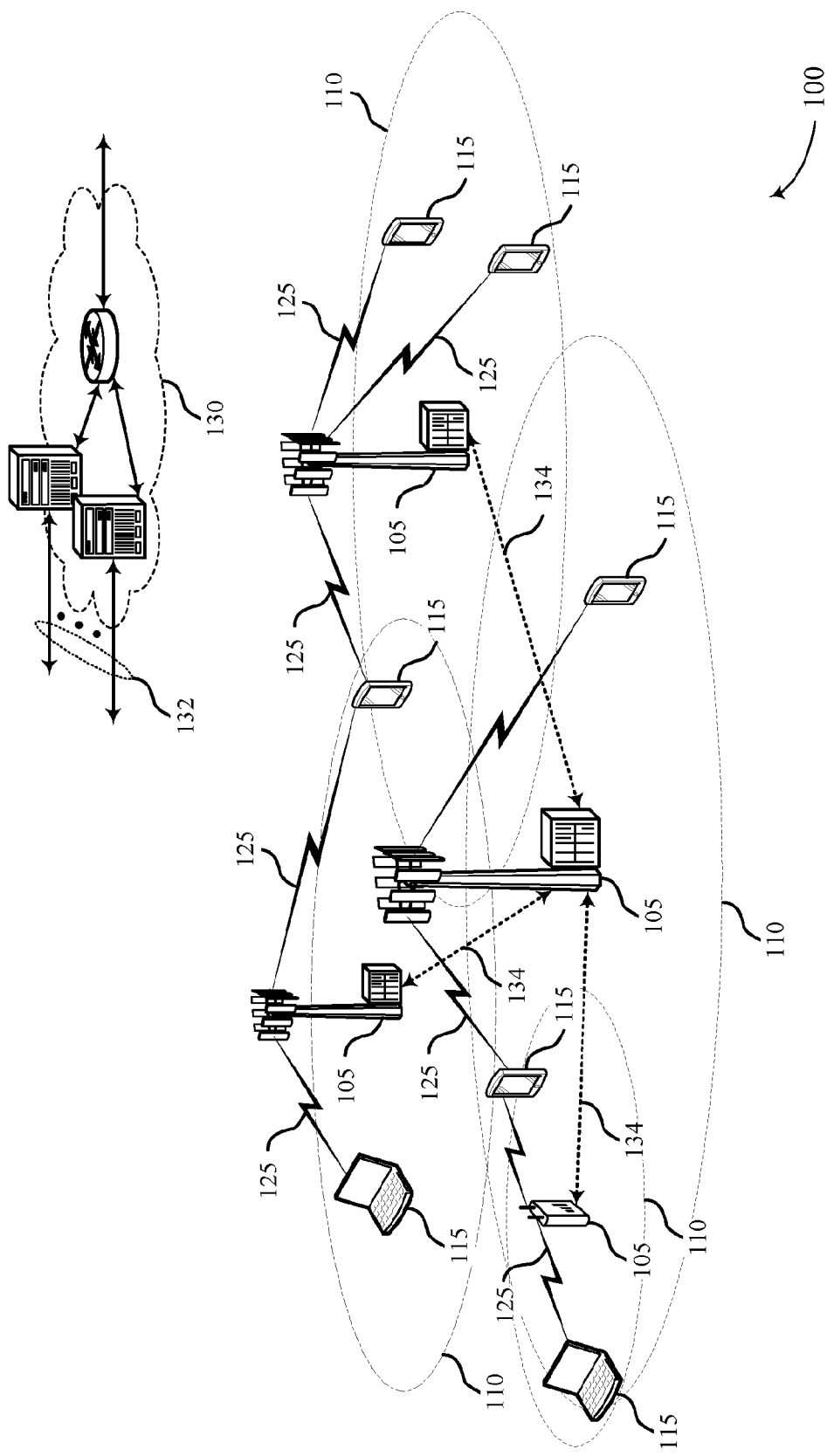
FIG. 1 illustrates an example of a system for wireless communication that supports partial band configuration for channel state information (CSI) in accordance with aspects of the present disclosure.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a Long Term Evolution (LTE), LTE-Advanced (LTE-A) network, or a New Radio (NR) network. In some cases, wireless communications system 100 may support enhanced broadband communications, ultra-reliable (i.e., mission critical) communications, low latency communications, and communications with low-cost and low-complexity devices.

Wireless communications system 100 may support efficient techniques for a base station 105 to utilize partial bands for signal transmission. Such techniques may allow a UE 115 to determine accurate CSI with low signaling overhead. The base station may configure multiple non-consecutive partial bands (e.g., in a comb structure) and different precoders may be utilized on different frequency and time resources. By utilizing partial band configurations, a UE 115 may perform channel estimation for a precoded channel in each partial band. UE 115 may also calculate a spectral efficiency according to resource element (RE)-level co-phase cycling. Based on the channel estimations for each partial band, the UE 115 may determine respective channel feedback parameters (e.g., CRI, RI, CQI) and report such parameters to the base station 105.

Base stations 105 may wirelessly communicate with UEs 115 via one or more base station antennas. Each base station 105 may provide communication coverage for a respective geographic coverage area 110. Communication links 125 shown in wireless communications system 100 may include uplink transmissions from a UE 115 to a base station 105, or downlink transmissions, from a base station 105 to a UE 115. Control information and data may be multiplexed on an uplink channel or downlink according to various techniques. Control information and data may be multiplexed on a downlink channel, for example, using time division multiplexing (TDM) techniques, frequency division multiplexing (FDM) techniques, or hybrid TDM-FDM techniques. In some examples, the control information transmitted during a transmission time interval (TTI) of a downlink channel may be distributed between different control regions in a cascaded manner (e.g., between a common control region and one or more UE-specific control regions).

UEs 115 may be dispersed throughout the wireless communications system 100, and each UE 115 may be stationary or mobile. A UE 115 may also be referred to as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may also be a cellular phone, a personal digital assistant (PDA), a wireless modem, a wireless communication device, a handheld device, a tablet computer, a laptop computer, a cordless phone, a personal electronic device, a handheld device, a personal computer, a wireless local loop (WLL) station, an Internet of Things (IoT) device, an Internet of Everything (IoE) device, a machine type communication (MTC) device, an appliance, an automobile, or the like.

In some cases, a UE 115 may also be able to communicate directly with other UEs (e.g., using a peer-to-peer (P2P) or device-to-device (D2D) protocol). One or more of a group of UEs 115 utilizing D2D communications may be within the coverage area 110 of a cell. Other UEs 115 in such a group may be outside the coverage area 110 of a cell, or otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out independent of a base station 105.

Some UEs 115, such as MTC or IoT devices, may be low cost or low complexity devices, and may provide for automated communication between machines, i.e., Machine-to-Machine (M2M) communication. M2M or MTC may refer to data communication technologies that allow devices to communicate with one another or a base station without human intervention. For example, M2M or MTC may refer to communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

In some cases, an MTC device may operate using half-duplex (one-way) communications at a reduced peak rate. MTC devices may also be configured to enter a power saving "deep sleep" mode when not engaging in active communications. In some cases, MTC or IoT devices may be designed to support mission critical functions and wireless communications system may be configured to provide ultra-reliable communications for these functions.

Base stations 105 may communicate with the core network 130 and with one another. For example, base stations 105 may interface with the core network 130 through backhaul links 132 (e.g., S1, etc.). Base stations 105 may communicate with one another over backhaul links 134 (e.g., X2, etc.) either directly or indirectly (e.g., through core network 130). Base stations 105 may perform radio configuration and scheduling for communication with UEs 115, or may operate under the control of a base station controller (not shown). In some examples, base stations 105 may be macro cells, small cells, hot spots, or the like. Base stations 105 may also be referred to as evolved NodeBs (eNBs) 105.

A base station 105 may be connected by an S1 interface to the core network 130. The core network may be an evolved packet core (EPC), which may include at least one mobility management entity (MME), at least one serving gateway (S-GW), and at least one Packet Data Network (PDN) gateway (P-GW). The MME may be the control node that processes the signaling between the UE 115 and the EPC. All user Internet Protocol (IP) packets may be transferred through the S-GW, which itself may be connected to the P-GW. The P-GW may provide IP address allocation as well as other functions. The P-GW may be connected to the network operators IP services. The operators IP services may include the Internet, the Intranet, an IP Multimedia Subsystem (IMS), and a Packet-Switched (PS) Streaming Service.

Wireless communications system 100 may operate in an ultra-high frequency (UHF) frequency region using frequency bands from 700 MHz to 2600 MHz (2.6 GHz), although some networks (e.g., a wireless local area network (WLAN)) may use frequencies as high as 4 GHz. This region may also be known as the decimeter band, since the wavelengths range from approximately one decimeter to one meter in length. UHF waves may propagate mainly by line of sight, and may be blocked by buildings and environmental features. However, the waves may penetrate walls sufficiently to provide service to UEs 115 located indoors. Transmission of UHF waves is characterized by smaller antennas and shorter range (e.g., less than 100 km) compared to transmission using the smaller frequencies (and longer waves) of the high frequency (HF) or very high frequency (VHF) portion of the spectrum. In some cases, wireless communications system 100 may also utilize extremely high frequency (EHF) portions of the spectrum (e.g., from 30 GHz to 300 GHz). This region may also be known as the millimeter band, since the wavelengths range from approximately one millimeter to one centimeter in length. Thus, EHF antennas may be even smaller and more closely spaced than UHF antennas. In some cases, this may facilitate use of antenna arrays within a UE 115 (e.g., for directional beamforming). However, EHF transmissions may be subject to even greater atmospheric attenuation and shorter range than UHF transmissions.

Thus, wireless communications system 100 may support millimeter wave (mmW) communications between UEs 115 and base stations 105. Devices operating in mmW or EHF bands may have multiple antennas to allow beamforming. That is, a base station 105 may use multiple antennas or antenna arrays to conduct beamforming operations for directional communications with a UE 115. Beamforming (which may also be referred to as spatial filtering or directional transmission) is a signal processing technique that may be used at a transmitter (e.g., a base station 105) to shape and/or steer an overall antenna beam in the direction of a target receiver (e.g., a UE 115). This may be achieved by combining elements in an antenna array in such a way that transmitted signals at particular angles experience constructive interference while others experience destructive interference.

Multiple-input multiple-output (MIMO) wireless systems use a transmission scheme between a transmitter (e.g., a base station 105) and a receiver (e.g., a UE 115), where both transmitter and receiver are equipped with multiple antennas. Some portions of wireless communications system 100 may use beamforming. For example, base station 105 may have an antenna array with a number of rows and columns of antenna ports that the base station 105 may use for beamforming in its communication with UE 115. Signals may be transmitted multiple times in different directions (e.g., each transmission may be beamformed differently). A mmW receiver (e.g., a UE 115) may try multiple beams (e.g., antenna subarrays) while receiving the synchronization signals.

In some cases, the antennas of a base station 105 or UE 115 may be located within one or more antenna arrays, which may support beamforming or MIMO operation. One or more base station antennas or antenna arrays may be collocated at an antenna assembly, such as an antenna tower. In some cases, antennas or antenna arrays associated with a base station 105 may be located in diverse geographic locations. A base station 105 may multiple use antennas or antenna arrays to conduct beamforming operations for directional communications with a UE 115.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use Hybrid ARQ (HARQ) to provide retransmission at the MAC layer to improve link efficiency. In the control plane, the Radio Resource Control (RRC) protocol layer may provide establishment, configuration, and maintenance of an RRC connection between a UE 115 and a network device (e.g., a base station 105), or core network 130 supporting radio bearers for user plane data. At the Physical (PHY) layer, transport channels may be mapped to physical channels.

In some cases, wireless communications system 100 may utilize enhanced component carriers (eCCs). An eCC may be characterized by one or more features including: wider bandwidth, shorter symbol duration, shorter TTIs, and modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (where more than one operator is allowed to use the spectrum). An eCC characterized by wide bandwidth may include one or more segments that may be utilized by UEs 115 that are not capable of monitoring the whole bandwidth or prefer to use a limited bandwidth (e.g., to conserve power).

In some cases, an eCC may utilize a different symbol duration than other CCs, which may include use of a reduced symbol duration as compared with symbol durations of the other CCs. A shorter symbol duration is associated with increased subcarrier spacing. A device, such as a UE 115 or base station 105, utilizing eCCs may transmit wideband signals (e.g., 20, 40, 60, 80 MHz, etc.) at reduced symbol durations (e.g., 16.67 microseconds). A TTI in eCC may consist of one or multiple symbols. In some cases, the TTI duration (that is, the number of symbols in a TTI) may be variable.

A shared radio frequency spectrum band may be utilized in an NR shared spectrum system. For example, an NR shared spectrum may utilize any combination of licensed, shared, and unlicensed spectrums, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across frequency) and horizontal (e.g., across time) sharing of resources.

In some cases, wireless communications system 100 may utilize both licensed and unlicensed radio frequency spectrum bands. For example, wireless communications system 100 may employ LTE License Assisted Access (LTE-LAA) or LTE Unlicensed (LTE U) radio access technology or NR technology in an unlicensed band such as the 5 GHz Industrial, Scientific, and Medical (ISM) band. When operating in unlicensed radio frequency spectrum bands, wireless devices such as base stations 105 and UEs 115 may employ listen-before-talk (LBT) procedures to ensure the channel is clear before transmitting data. In some cases, operations in unlicensed bands may be based on a CA configuration in conjunction with CCs operating in a licensed band. Operations in unlicensed spectrum may include downlink transmissions, uplink transmissions, or both. Duplexing in unlicensed spectrum may be based on frequency division duplexing (FDD), time division duplexing (TDD) or a combination of both.

A base station 105 may utilize a number of data precoders for transmitting signals to one or multiple UEs 115. For example, the number of precoders may correspond to the number of CSI-RSs configured by base station 105. In some cases, base station 105 may utilize precoder cycling by varying the data precoders across different sets of frequency tones (e.g., resource blocks (RBs)) within a given time interval (e.g., a slot, mini slot, orthogonal frequency division multiplexing (OFDM) symbol). For instance, base station 105 may utilize a first precoder for a first set of RBs (e.g., even numbered RBs) within a given slot and a second precoder for a second set of RBs (e.g., odd numbered RBs) within the given slot. In some examples, base station 105 may transmit a non-precoded CSI-RS. A UE 115 may measure the non-precoded (i.e., Class A) CSI-RS or precoded (i.e., Class B) CSI-RS received and report the best CRI along with an associated RI, spectral efficiency, or CQI back to base station 105. Because the precoder may vary across RBs for precoded CSI-RSs within a frequency bandwidth, the UE 115 may be unable to perform an accurate channel estimation across the bandwidth.

Figure 2:
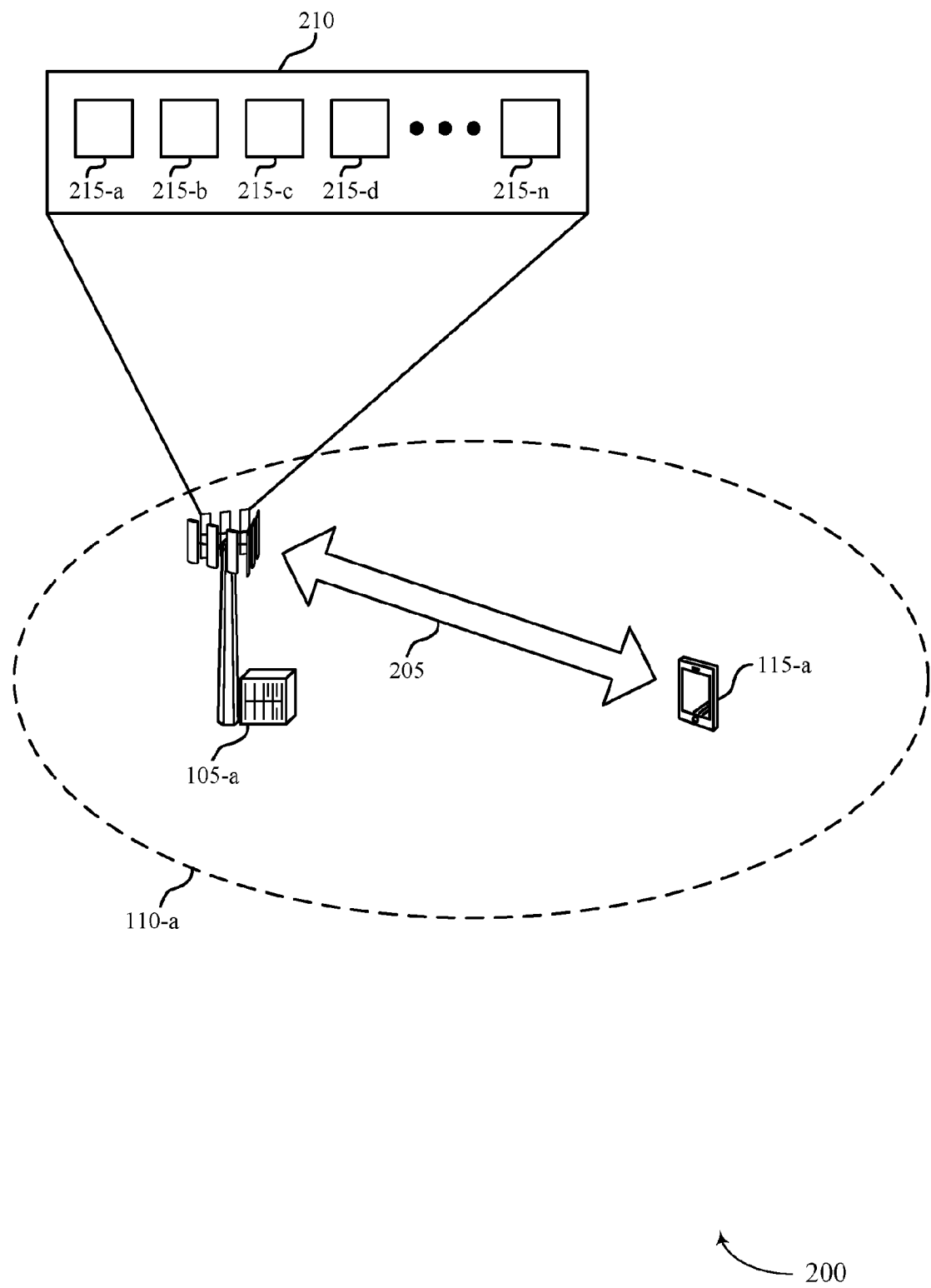
FIG. 2 illustrates an example of a wireless communications system that supports partial band configuration for CSI in accordance with aspects of the present disclosure.

FIG. 2 illustrates an example of a wireless communications system 200 that supports partial band configuration for CSI in accordance with various aspects of the present disclosure. In some examples, wireless communications system 200 may implement aspects of wireless communications system 100. Wireless communications system 200 includes base station 105-*a* and UE 115-*a*, which may be examples of a base station 105 and UE 115 described with reference to FIG. 1.

As shown, base station 105-*a* and UE 115-*a* may exchange messages by wirelessly communicating over communication link 205, which may be an example of communication link 125 as described with reference to FIG. 1. Communication link 205 may be associated with a given radio access network (RAN) that supports operations over one or more bands, each of which may include multiple carriers. In some examples, base station 105-*a* may include one or more physical antennas 210 that may be used for communicating with UE 115-*a*. Signals may be modulated onto frequency resources (e.g., tones) and time resources (e.g., symbols and transmitted to a UE 115-*a* using the one or more physical antennas 210.

According to some aspects, base station 105-*a* may also include one or more antenna ports 215-*a* through 215-*n*, which may be used for different transit diversity schemes or spatial multiplexing schemes. In some cases, the number of antenna ports 215 may be different from the number of physical antennas 210, though in other examples, the number of antenna ports 215 and physical antennas 210 may be the same. Each antenna port may be associated with a different RS sequence corresponding to different RSs and may support transmission of UE-specific signals or common signals (e.g., RSs transmitted to multiple UEs 115). For instance, antenna ports 215-*a*, 215-*b*, and 215-*c* may support UE-specific signals (e.g., demodulation RS (DMRS)), while antenna ports 215-*d* through 215-*n* may support CSI-RSs.

In the example of FIG. 2, base station 105-*a* may transmit one or more RSs to UE 115-*a* according to an RS scheme. For instance, base station 105-*a* may configure multiple partial bands for transmission of one or more CSI-RSs. The partial bands may be non-consecutive in the frequency domain, time domain, or a combination thereof and may be transmitted to the UE 115-*a* via communication link 205. Each partial band may be configured according to a respective partial band configuration, which may include a time duration (e.g., a slot, a mini slot, a symbol) for transmission of the CSI-RS in the partial band. The partial band configuration may also include a cycling granularity that indicates the number of RBs over which the CSI-RS is transmitted (e.g., 1, 2, 3, RBs). The partial band configuration may also indicate the total number of partial bands configured by base station 105-*a*, which may be based on the number of candidate precoders used by base station 105-*a*, and a number of CSI-RS ports for each partial band (e.g., based on different coding levels or associated antenna ports 215). In some cases, base station 105-*a* may utilize a different precoder for one or more partial bands such that the precoding configuration for a CSI-RS of a first partial band is different from the precoding configuration for a CSI-RS of a second partial band. In some examples, base station 105-*a* may determine the precoder type (e.g., Class B) for precoding, which may be selected from a set of precoders or precoder configurations or may be indicated by another network entity (e.g., a core network 130). Alternatively, the precoding configuration may be based on reporting from UE 115-*a* (e.g., in a hybrid CSI-RS mode).

Figure 3:
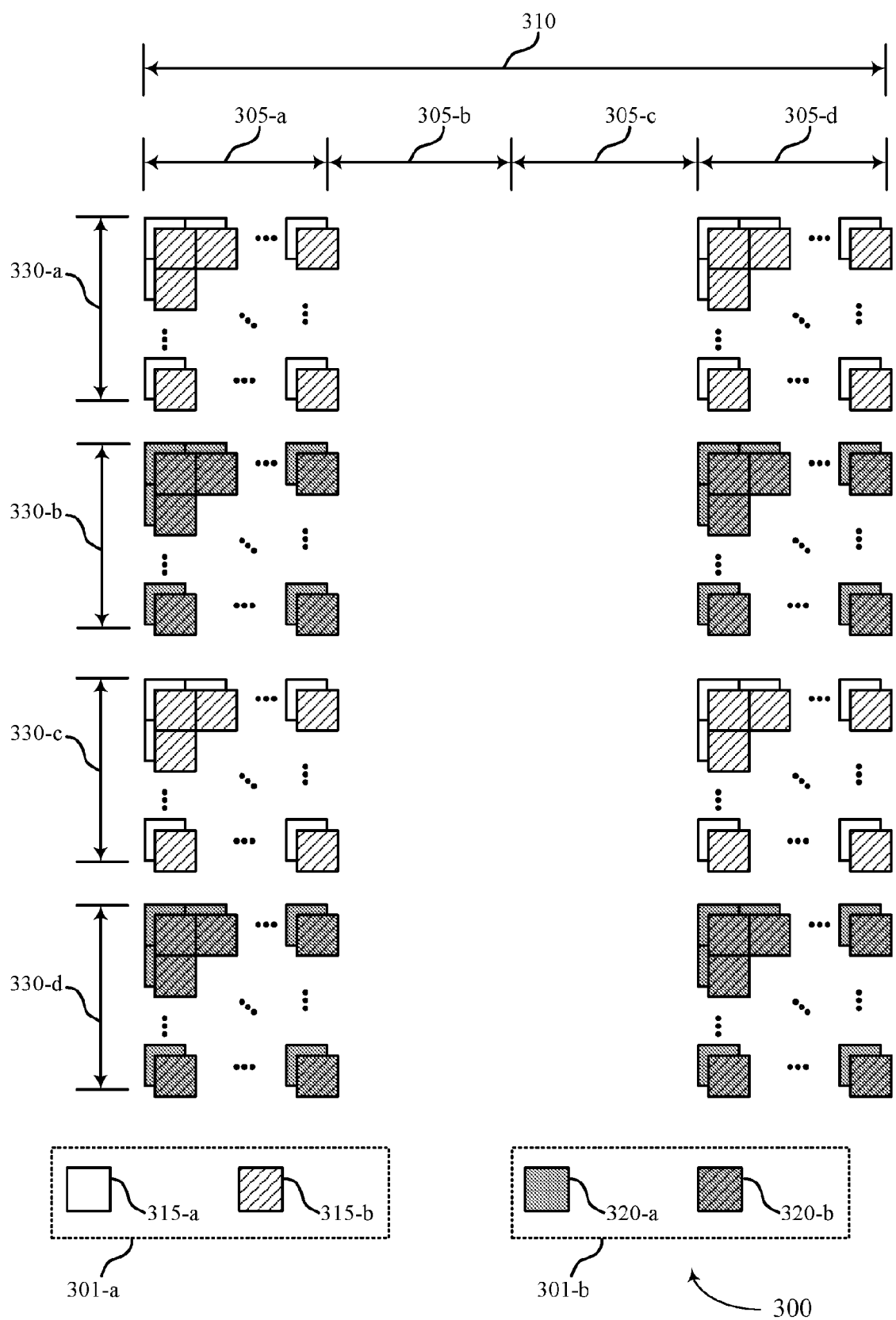
FIG. 3 illustrates an example of a reference signal (RS) scheme that supports partial band configuration for CSI in accordance with aspects of the present disclosure.

FIG. 3 illustrates an example of an RS scheme 300 that supports partial band configuration for CSI in accordance with various aspects of the present disclosure. In some examples, RS scheme 300 may implement aspects of wireless communications systems 100 and/or 200 as described with reference to FIGS. 1 and 2. RS scheme 300 may include multiple partial bands 301, which may be configured by a network node such as a base station 105 as described with reference to FIGS. 1 and 2. While two partial bands 301-*a* and 301-*b* are shown, the number of partial bands 301 may vary (e.g., 1, 2, 3, 5, 8, 9).

Each partial band 301 may have varying cycling granularities in the time domain or the frequency domain or a combination thereof. The cycling granularity in the frequency domain may indicate the number of consecutive RBs 330 (e.g., 1, 2, 3, 5, or 9 RBs) within each partial band 301. As shown in the example of FIG. 3, partial bands 301-*a* and 301-*b* may each have a cycling granularity of 1 RB in the frequency domain, and each partial band 301 may span every other RB 330 in the frequency domain. In this example, partial band 301-*a* may span odd numbered RBs 330-*a* and 330-*c*, while partial band 301-*b* may span even numbered RBs 330-*b* and 330-*d*. In some cases, each partial band 301 may span multiple sets of consecutive RBs 330.

In the time domain, each partial band 301 may span a given time interval 305 within time duration 310. The given time intervals 305 may be any time period (e.g., slot, mini slot, symbol, subframe, etc.). In this example, both of partial bands 301-*a* and 301-*b* may be configured to span time interval 305-*a* (e.g., a slot), skip time intervals 305-*b* and 305-*c*, and repeat in time interval 305-*d*. Though shown spanning time intervals 305-*a* and 305-*d*, partial bands 301 may span multiple sets of time intervals 305 or each partial band 301 may span a different time interval 305 and may be associated with a different cycling granularity in the time domain. Each partial band 301 may have a cycling granularity in both the time domain and the frequency domain.

In some examples, if the cycling granularity in the time domain is 1 slot, there may be no cycling or partial bands in the time domain for RS scheme 300, and if the cycling granularity in the frequency domain is 1 RB, a base station 105 may configure 2 partial bands such that a first partial band spans even RBs and a second partial band spans odd RBs (e.g., partial bands 301-*a* and 301-*b*). Additionally or alternatively, if the cycling granularity is half a slot (e.g., a mini-slot) in the time domain and the cycling granularity in the frequency domain is the whole band, the base station 105 may configure partial band 301-*a* in a first half of a slot (e.g., first mini-slot) and partial band 301-*b* in a second half of the slot (e.g., second mini-slot)). Further, if the time interval is half a slot (e.g., a mini-slot) in the time domain and the cycling granularity in the frequency domain is 1 RB, the base station 105 may configure four partial bands such that the first partial band spans even RBs in a first mini-slot, a second partial band spans odd RBs in the first mini-slot, a third partial band spans even RBs in a second mini-slot, and a fourth partial band spans odd RBs in the second mini-slot.

Each partial band 301 may be configured for transmission of a CSI-RS during respective time intervals 305. Further, each partial band 301 may be configured to utilize a number of antenna ports for transmission of the CSI-RSs. For example, two antenna ports 315-a and 315-b may be used for the partial band 301-a, and two antenna ports 320-a and 320-b may be used for the partial band 301-b. While two antenna ports are shown for each partial band 301 in FIG. 3, the number of antenna ports may vary for each partial band 301. For instance, the number of antenna ports may be 2, 4, 5, 7, 8, etc.

In some cases, the number of partial bands 301 may correspond to the number of precoders utilized for precoding (e.g., performed by base station 105 or other network entity). In the example of FIG. 3, two precoders may be utilized, one for partial band 301-a and another for partial band 305-b. Due to the varying precoders used for each of the partial bands, the two partial bands 301 may be precoded according to respective precoding configurations. For example, partial bands 301-a and 301-b may each utilize different precoders to reflect the precoder cycling behavior. An RB level beam cycling may be configured for each of partial bands 301-a and 301-b based on parameters that correspond to a given partial band configuration (Partial Band 0, Partial Band 1, etc.), as indicated in example configurations of Tables 1 or 2 below.

TABLE 1

| | Cycling Granularity | Resource Block Set | Time Interval | Number of CSI-RS Ports | Precoder of CSI-RS |
|---|---|---|---|---|---|
| Partial Band 0 | 1 RB | 0, 4, 8, . . . | 1 slot | 2 | $\begin{bmatrix} b_0 & 0 \\ 0 & b_0 \end{bmatrix}$ |
| Partial Band 1 | 1 RB | 1, 5, 9, . . . | 1 slot | 2 | $\begin{bmatrix} b_1 & 0 \\ 0 & b_1 \end{bmatrix}$ |
| Partial Band 2 | 1 RB | 2, 6, 10, . . . | 1 slot | 2 | $\begin{bmatrix} b_2 & 0 \\ 0 & b_2 \end{bmatrix}$ |
| Partial Band 3 | 1 RB | 3, 7, 11, . . . | 1 slot | 2 | $\begin{bmatrix} b_3 & 0 \\ 0 & b_3 \end{bmatrix}$ |

As shown in Table 1, Partial Bands 0, 1, 2, and 3 may be each configured with a set of parameters (cycling granularity, RB set, time interval, etc.). For example, although each of Partial Bands 0, 1, 2, and 3 have a same time interval (1 slot), Partial Band 0 may be configured with RB set {0, 4, 8, . . . } while Partial Band 1 may be configured with a different RB set {1, 5, 9, . . . }. Further, each partial band may utilize different beam vectors ($b_n$) for precoding of the CSI-RS, as indicated in Table 1. For instance, although each of Partial Bands 0, 1, 2, and 3 have a same RB level cycling granularity (1 RB), different beam vectors may be utilized for different Partial Bands. In this example, 4 different beam vectors ($b_0$, $b_1$, $b_2$, $b_3$) are configured, one for each of Partial Bands 0, 1, 2, and 3.

TABLE 2

| | Cycling Granularity | Resource Block Set | Time Interval | Number of CSI-RS Ports | Precoder of CSI-RS |
|---|---|---|---|---|---|
| Partial Band 0 | 2 RBs | [0, 1], [8, 9], [16, 17], . . . | 1 slot | 2 | $\begin{bmatrix} b_0 & 0 \\ 0 & b_0 \end{bmatrix}$ |

TABLE 2-continued

| | Cycling Granularity | Resource Block Set | Time Interval | Number of CSI-RS Ports | Precoder of CSI-RS |
|---|---|---|---|---|---|
| Partial Band 1 | 2 RBs | [2, 3], [10, 11], [18, 19], . . . | 1 slot | 2 | $\begin{bmatrix} b_1 & 0 \\ 0 & b_1 \end{bmatrix}$ |
| Partial Band 2 | 2 RBs | [4, 5], [12, 13], [20, 21], . . . | 1 slot | 2 | $\begin{bmatrix} b_2 & 0 \\ 0 & b_2 \end{bmatrix}$ |
| Partial Band 3 | 2 RBs | [6, 7], [14, 15], [22, 23], . . . | 1 slot | 2 | $\begin{bmatrix} b_3 & 0 \\ 0 & b_3 \end{bmatrix}$ |

Similar to Table 1, Table 2 shows various configuration parameters for Partial Bands 0, 1, 2, and 3 (e.g., such as cycling granularity, RB set, time interval, etc.). In Table 2, although each of Partial Bands 0, 1, 2, and 3 may have a same time interval (1 slot), each of the Partial Bands 0, 1, 2, and 3 may be configured with different RB sets due to a cycling granularity of 2 RBs in the frequency domain. For instance, Partial Band 1 may be configured with RB set {[0,1], [8,9], [16,17], . . . }, and Partial Band 3 may be configured with RB set {[6,7], [14,15], [22,23], . . . }. Further, each partial band may utilize different beam vectors ($b_n$) for precoding of the CSI-RS, as indicated in Table 2. For instance, although each of Partial Bands 0, 1, 2, and 3 may have a same RB level cycling granularity (2 RBs), different beam vectors ($b_0$, $b_1$, $b_2$, $b_3$) may be utilized for different Partial Bands.

In some cases, a base station 105 may configure K>1 CSI-RS resources. The partial band configuration in the K CSI-RS resources may be different in terms of the number of partial bands, the cycling granularity in the frequency or time domain, the number of CSI-RS ports, the precoder of CSI-RS, or any combination thereof. For instance, a base station 105 may configure two CSI-RS resources, the partial band configuration for the first CSI-RS resource may be configured based on Table 1, while the partial band configuration for the second CSI-RS resource may be configured based on a Table 2. In this case, a partial band configuration for the first CSI-RS resource may be Partial Band 1 of Table 1 having a cycling granularity of 1 RB in the frequency domain, and a partial band configuration for the second CSI-RS resource may be Partial Band 2 of Table 2 having a cycling granularity of 2 RBs in the frequency domain.

The precoding configuration may be based on the data precoder used to precode the RS for transmission using a given partial band. A data precoder (W) may be defined as the product of a beam matrix and a co-phase vector (e.g., W=W1× W2). The beam matrix (W1) may be given as $$\begin{bmatrix} b_n & 0 \\ 0 & b_n \end{bmatrix},$$

where n is the beam vector index. The co-phase vector (W2) may be an element of:

$$\left\{ \begin{bmatrix} 1 \\ 1 \end{bmatrix}, \begin{bmatrix} 1 \\ -1 \end{bmatrix}, \begin{bmatrix} 1 \\ j \end{bmatrix}, \begin{bmatrix} 1 \\ -j \end{bmatrix} \right\}.$$

In the examples shown in Table 1 and Table 2, the cycling precoders for each partial band may be determined based on W1. In some other cases, the cycling precoders for each partial band may be determined based on W=W1×W2.

In some examples, base station 105 may signal the partial band configuration in a dynamic or semi-static manner. For instance, the CSI-RS may be signaled by the base station 105 (e.g., to a set of UEs 115) dynamically through downlink control information (DCI). In some cases, a DCI format designated for partial band configurations may be utilized for indicating one or more partial band configuration parameters. Additionally or alternatively, the configuration parameters may be embedded in a DCI message according to a DCI format for CSI-RS. The DCI may be UE-specific or group specific.

In some cases, the CSI-RS may be semi-statically configured (e.g., through RRC signaling). In order to reduce signaling overhead, the base station 105 may define a set of partial band configurations (e.g., as shown in Table 3 below). The set of partial band configurations may include multiple parameters, such as the number of partial bands ($N_{PB}$), the cycling granularity in the frequency domain ($N_{cyc}$), the number of CSI-RS ports for each partial band ($N_p$), and the cycling granularity in the time domain (i.e., time interval, $T_{slot}$). In some examples, the base station 105 may utilize multiple bits (e.g., 2, 3, 4, or 7 bits) to signal the group and partial band configuration. For multiple CSI-RS resources, the precoders and parameters may differ across different CSI-RS resources.

TABLE 3

| | $N_{PB}$ | $N_{cyc}$ | $N_p$ | $T_{slot}$ |
|---|---|---|---|---|
| Group 0 | 1 | N/A | 2 | 1 |
| Group 1 | 2 | N/A | 4 | 0.5 |
| Group 2 | 2 | 1 | 4 | 1 |
| Group 3 | 2 | 2 | 4 | 1 |
| Group 4 | 4 | 2 | 2 | 0.5 |
| Group 5 | 4 | 2 | 4 | 0.5 |
| Group 6 | 4 | 1 | 2 | 1 |
| Group 7 | 4 | 1 | 4 | 1 |

In some examples, Group 0 may indicate the bandwidth is reserved for a single precoder and that no RB-level or partial slot cycling is utilized. Group 1 may indicate partial slot beam pair cycling, and Group 2 may indicate RB-level beam pair cycling. Group 3 may indicate two RB-level beam pair cycling. Group 4 may indicate two RB-level plus partial slot beam cycling. Group 5 may indicate two RB-level plus partial slot beam pair cycling. Group 6 may indicate RB-level beam cycling. Group 7 may indicate RB-level beam pair cycling.

Figure 4:
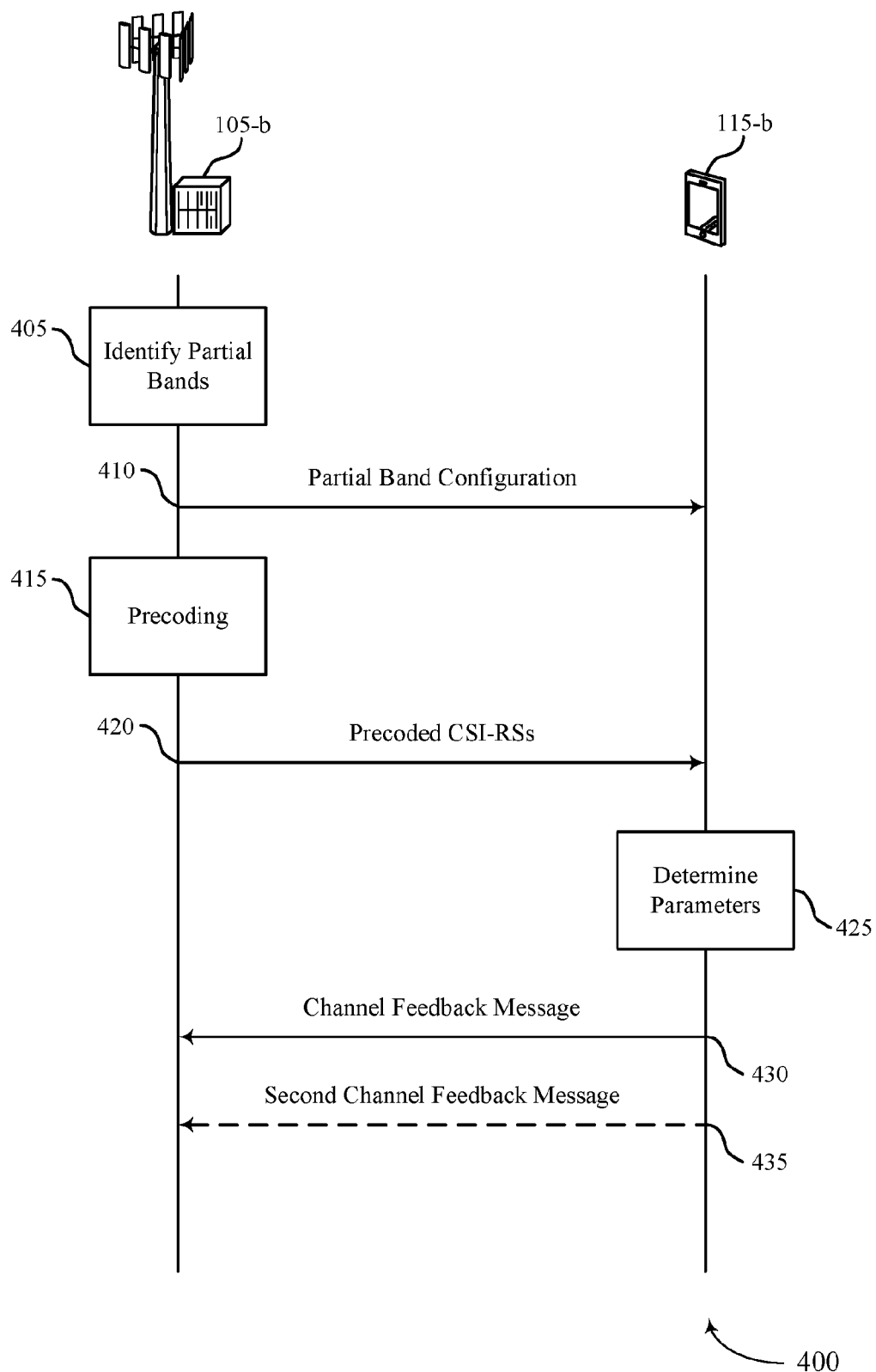
FIG. 4 illustrates an example of a process flow that supports partial band configuration for CSI in accordance with aspects of the present disclosure.

FIG. 4 illustrates an example of a process flow 400 that supports partial band configuration for channel state information in accordance with various aspects of the present disclosure. In some examples, process flow 400 may implement aspects of wireless communications system 100 and/or 200. Process flow 400 illustrates aspects of technique performed by a base station 105-b, which may be an example of a base station 105 described with reference to FIGS. 1-3. Process flow 400 may also illustrate aspects of techniques performed by a UE 115-b, which may be an example of a UE 115 described with reference to FIGS. 1-3.

At 405, base station 105-b may identify a CSI-RS resource set with one CSI-RS resource for transmission of multiple CSI-RSs to UE 115-b, where the CSI-RS resource is partitioned according to at least a first non-consecutive partial band and a second non-consecutive partial band in a frequency domain, a time domain, or a combination thereof. Base station 105-b may further identify a total number of precoder configurations for transmission of the multiple CSI-RSs, where the CSI-RS resource set may be partitioned into a plurality non-consecutive partial bands based on the total number of precoder configurations.

At 410, base station 105-b may transmit one or both of the first partial band configuration or the second partial band configuration to a set of UEs including UE 115-b. In some examples, the transmission of one or both of the first partial band configuration and the second partial band configuration may be performed via an RRC message, MAC channel element (CE), or via DCI.

At 415, base station 105-b may precode, according to a first precoder configuration, a first CSI-RS for transmission over a first resource subset of the CSI-RS resource associated with the first non-consecutive partial band. Additionally, base station 105-a may precode, according to a second precoder configuration, a second CSI-RS for transmission over a second resource subset of the CSI-RS resource associated with the second non-consecutive partial band. The first resource subset may span a time interval different from the second resource. UE 115-b may receive an indication of one or both of the first partial band configuration or the second partial band configuration. The indication may be received via an RRC message, MAC CE, or via DCI.

At 420, UE 115-b may receive, from base station 105-b, a first CSI-RS over the first resource subset of the CSI-RS resource associated with the first non-consecutive partial band, where the first CSI-RS is precoded according to a first precoder configuration. The first partial band configuration may indicate at least one of the first resource subset, a cycling granularity for the first non-consecutive partial band, a time interval for the first CSI-RS, a number of ports associated with transmission of the first CSI-RS, or a combination thereof. The first cycling granularity for precoding the first non-consecutive partial band may be equal to a second cycling granularity for precoding the second non-consecutive partial band. The cycling granularity may include a number of RBs in a frequency domain, time domain, or a combination thereof of the first resource subset. Base station 105-b may transmit the precoded first CSI-RS.

Additionally, at 420, in some cases, the UE 115-b may receive, from base station 105-b, a second CSI-RS over a second resource subset of the CSI-RS resource associated with a second non-consecutive partial band, where the second CSI-RS is precoded according to a second partial band configuration. Base station 105-b may transmit the precoded second CSI-RS using a part or all of the antenna ports in the set of antenna ports. The transmission of the precoded first CSI-RS over the first resource subset may occur at a different time than the transmission of the precoded second CSI-RS over the second non-consecutive partial band. Additionally, the first resource subset may span a time interval different from or the same as the second resource subset.

At 425, UE 115-b may determine, based on the first and second CSI-RSs, one or more channel state parameters for the CSI-RS resource. In some cases, the one or more channel state parameters may include at least one of one or more of a CRI, a precoding matrix indicator, a precoding type indicator, an RI, a CQI, or a combination thereof. In some cases, UE 115-b may derive the channel state based on the average spectral efficiency of the first and second non-consecutive partial bands. UE 115-b may calculate a spectral efficiency for the first or second CSI-RS based on a co-phase vector associated with each RE of the first or second resource subset. Additionally, UE 115-*b* may estimate a channel matrix for the first or second non-consecutive partial band corresponding to a beam matrix associated with each RB of the first or second resource subset.

At 430, UE 115-*b* may transmit, to base station 105-*b*, feedback message that indicates one or more channel state parameters. The one or more channel state parameters may include at least one of a precoding matrix indicator, a precoding type indicator, an RI, a CQI, or a combination thereof. Base station 105-*b* may receive the channel feedback message from UE 115-*b*, where one or both of precoding the first CSI-RS or precoding the second CSI-RS may be based on the channel feedback message.

In some cases, base station 105-*b* may configure the CSI-RS resource set with multiple CSI-RS resources, where each CSI-RS resource is partitioned according to at least a first non-consecutive partial band and a second non-consecutive partial band. At least two CSI-RS resources may differ by at least a number of partial bands, a time duration for each partial band, a cycling granularity for each partial band, a number of CSI-RS ports for each partial band, precoder used for each partial band, or any combination thereof. Base station 105-*b* may transmit a CSI-RS resource set configuration to UE 105-*b*, where the CSI-RS resource set configuration includes at least one of a number of CSI-RS resources of the CSI-RS resource set, a number of partial bands in each CSI-RS resource, a time duration for each partial band, a cycling granularity for each partial band, a number of CSI-RS ports for each partial band, or a combination thereof. The configuration may be included in an RRC message, MAC CE, or in DCI. A format of the DCI may correspond to one of a special DCI format or a CSI-RS DCI format. Additionally, the DCI may be one of UE-specific or group-specific.

Figure 5:
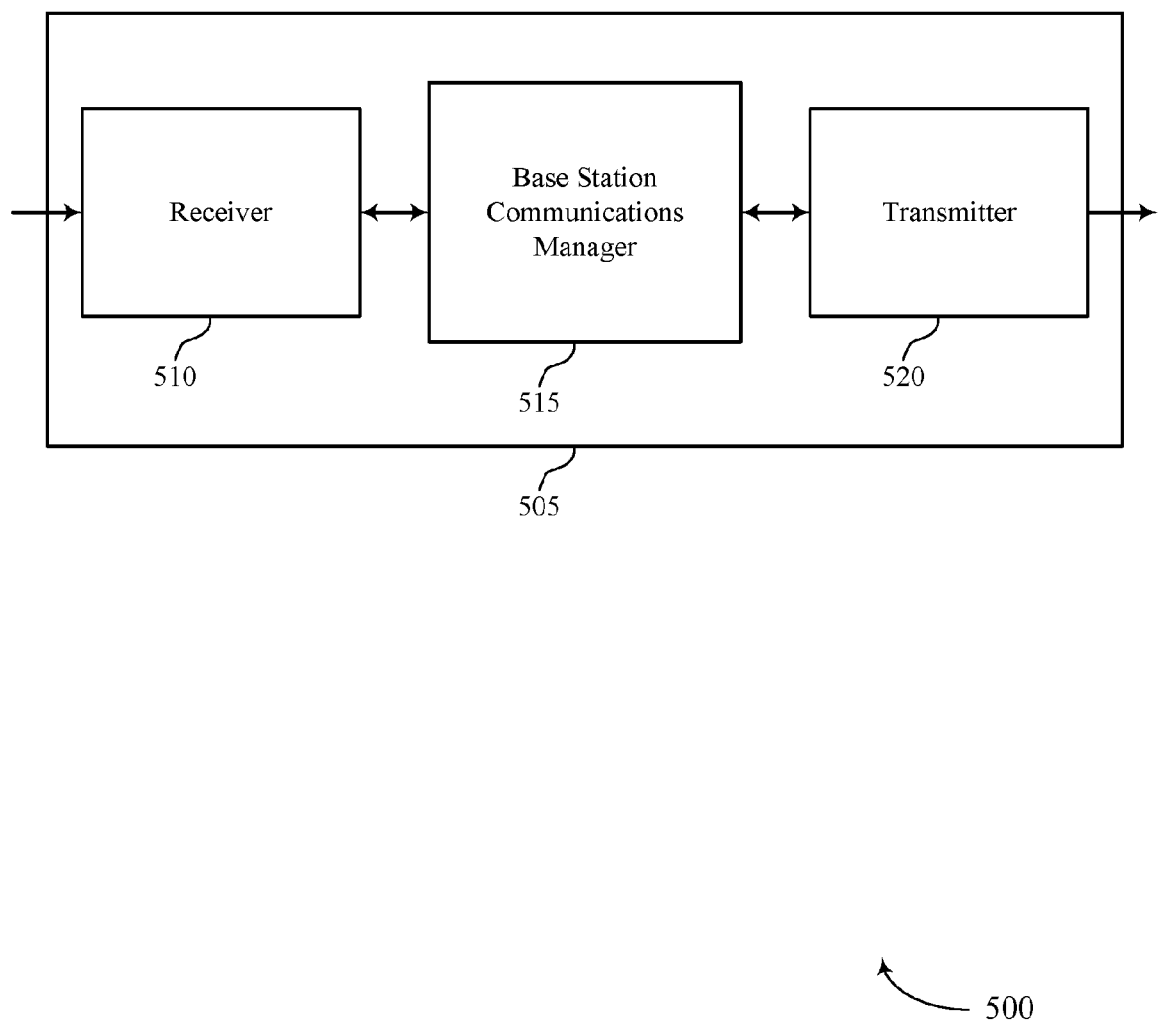
FIGS. 5 through 7 show block diagrams of a device that supports partial band configuration for CSI in accordance with aspects of the present disclosure.

FIG. 5 shows a block diagram 500 of a wireless device 505 that supports partial band configuration for channel state information in accordance with aspects of the present disclosure. Wireless device 505 may be an example of aspects of a base station 105 as described herein. Wireless device 505 may include receiver 510, base station communications manager 515, and transmitter 520. Wireless device 505 may also include a processor. Each of these components may be in communication with one another (e.g., via one or more buses).

Receiver 510 may receive information such as packets, user data, or control information associated with various information channels (e.g., control channels, data channels, and information related to partial band configuration for channel state information, etc.). Information may be passed on to other components of the device. The receiver 510 may be an example of aspects of the transceiver 835 described with reference to FIG. 8. The receiver 510 may utilize a single antenna or a set of antennas.

Base station communications manager 515 may be an example of aspects of the base station communications manager 815 described with reference to FIG. 8.

Base station communications manager 515 and/or at least some of its various sub-components may be implemented in hardware, software executed by a processor, firmware, or any combination thereof. If implemented in software executed by a processor, the functions of the base station communications manager 515 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure.

The base station communications manager 515 and/or at least some of its various sub-components may be physically located at various positions, including being distributed such that portions of functions are implemented at different physical locations by one or more physical devices. In some examples, base station communications manager 515 and/or at least some of its various sub-components may be a separate and distinct component in accordance with various aspects of the present disclosure. In other examples, base station communications manager 515 and/or at least some of its various sub-components may be combined with one or more other hardware components, including but not limited to an input/output (I/O) component, a transceiver, a network server, another computing device, one or more other components described in the present disclosure, or a combination thereof in accordance with various aspects of the present disclosure.

Base station communications manager 515 may identify a CSI-RS resource set for transmission of multiple CSI-RSs to a UE, where the CSI-RS resource set may have one or more CSI-RS resources, and each CSI-RS resource of the CSI-RS resource set is partitioned according to at least a first non-consecutive partial band and a second non-consecutive partial band in a frequency domain, time domain, or a combination thereof. Base station communications manager 515 may precode, according to a first partial band configuration, a first CSI-RS for transmission over a first resource subset of a CSI-RS resource associated with the first non-consecutive partial band, and precode, according to a second partial band configuration, a second CSI-RS for transmission over a second resource subset of the a CSI-RS resource associated with the second non-consecutive partial band. Base station communications manager 515 may transmit, to the UE, the precoded first CSI-RS over the first resource subset and the precoded second CSI-RS using the second resource subset.

Transmitter 520 may transmit signals generated by other components of the device. In some examples, the transmitter 520 may be collocated with a receiver 510 in a transceiver module. For example, the transmitter 520 may be an example of aspects of the transceiver 835 described with reference to FIG. 8. The transmitter 520 may utilize a single antenna or a set of antennas.

Figure 6:
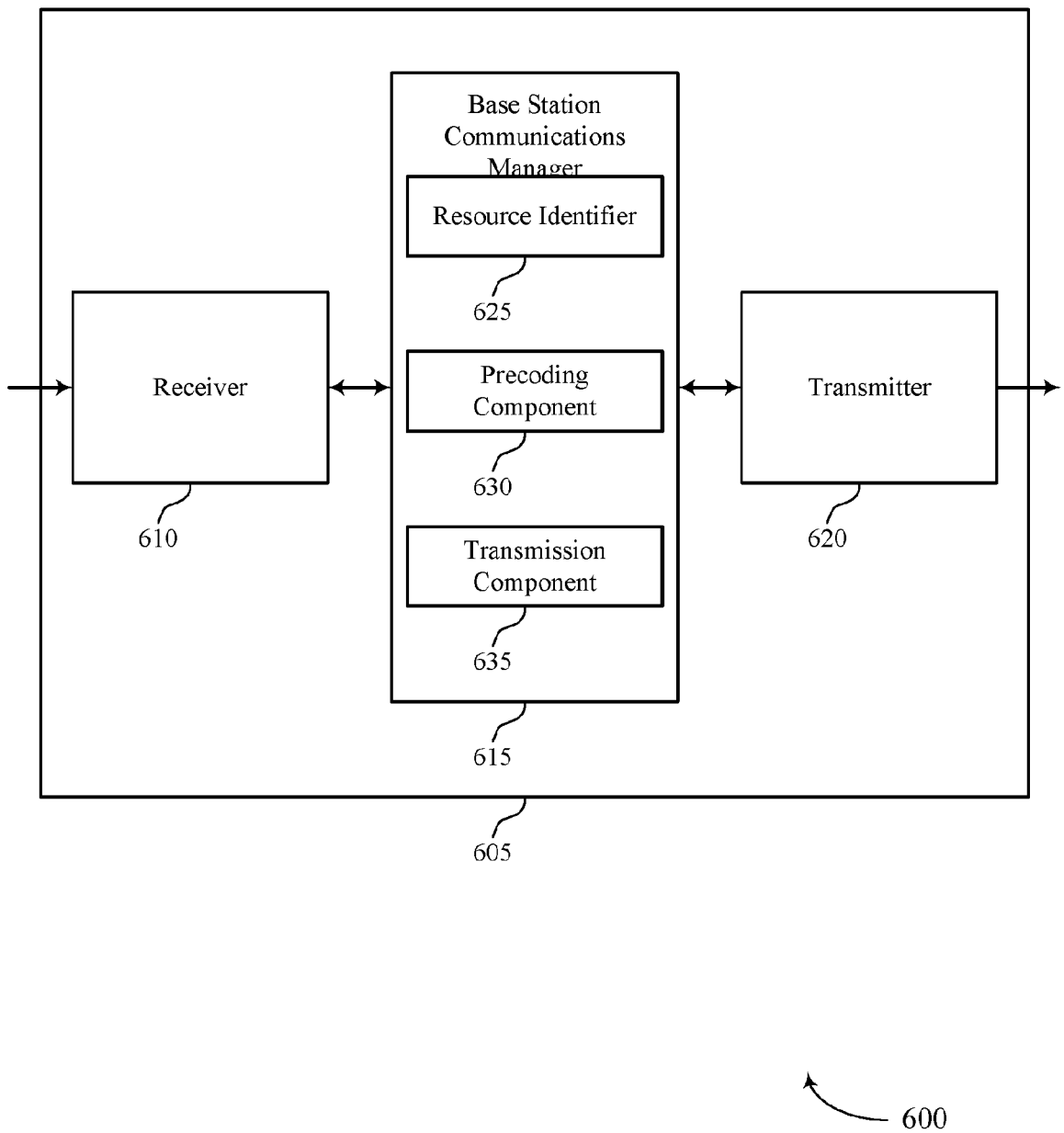

FIG. 6 shows a block diagram 600 of a wireless device 605 that supports partial band configuration for channel state information in accordance with aspects of the present disclosure. Wireless device 605 may be an example of aspects of a wireless device 505 or a base station 105 as described with reference to FIG. 5. Wireless device 605 may include receiver 610, base station communications manager 615, and transmitter 620. Wireless device 605 may also include a processor. Each of these components may be in communication with one another (e.g., via one or more buses).

Receiver 610 may receive information such as packets, user data, or control information associated with various information channels (e.g., control channels, data channels, and information related to partial band configuration for channel state information, etc.). Information may be passed on to other components of the device. The receiver 610 may be an example of aspects of the transceiver 835 described with reference to FIG. 8. The receiver 610 may utilize a single antenna or a set of antennas.

Base station communications manager 615 may be an example of aspects of the base station communications manager 815 described with reference to FIG. 8. Base station communications manager 615 may also include resource identifier 625, precoding component 630, and transmission component 635.

Resource identifier 625 may identify a CSI-RS resource set for transmission of multiple CSI-RSs to a UE, where the CSI-RS resource set may have one or more CSI-RS resources, and each CSI-RS resource of the CSI-RS resource set is partitioned according to at least a first non-consecutive partial band and a second non-consecutive partial band in a frequency domain, time domain, or a combination thereof.

Precoding component 630 may precode, according to a first partial band configuration, a first CSI-RS for transmission over a first resource subset of a CSI-RS resource associated with the first non-consecutive partial band and precode, according to a second partial band configuration, a second CSI-RS for transmission over a second resource subset of a CSI-RS resource associated with the second non-consecutive partial band. In some cases, the first CSI-RS may be precoded according to a first precoder configuration, and the second CSI-RS may be precoded according to a second precoder configuration. In some examples, the first resource subset may span a time interval different from the second resource subset. In some aspects, a first cycling granularity for precoding the first non-consecutive partial band may be equal to or different from a second cycling granularity for precoding the second non-consecutive partial band. In some cases, the first cycling granularity may be a parameter of the first partial band configuration, and the second cycling granularity may be a parameter of the second partial band configuration.

Transmission component 635 may transmit, to the UE, the precoded first CSI-RS over the first resource subset and the precoded second CSI-RS using the second resource subset. In some cases, the transmission of the precoded first CSI-RS over the first resource subset may occur at a different time than the transmission of the precoded second CSI-RS over the second non-consecutive partial band. In some examples, transmitting the precoded first CSI-RS over the first resource subset may include transmitting the precoded first CSI-RS using a part or all of the antenna ports in a set of antenna ports. In some aspects, transmitting the precoded second CSI-RS over the second resource subset may include transmitting the precoded second CSI-RS using a part or all of the antenna ports in the set of antenna ports.

Transmitter 620 may transmit signals generated by other components of the device. In some examples, the transmitter 620 may be collocated with a receiver 610 in a transceiver module. For example, the transmitter 620 may be an example of aspects of the transceiver 835 described with reference to FIG. 8. The transmitter 620 may utilize a single antenna or a set of antennas.

Figure 7:
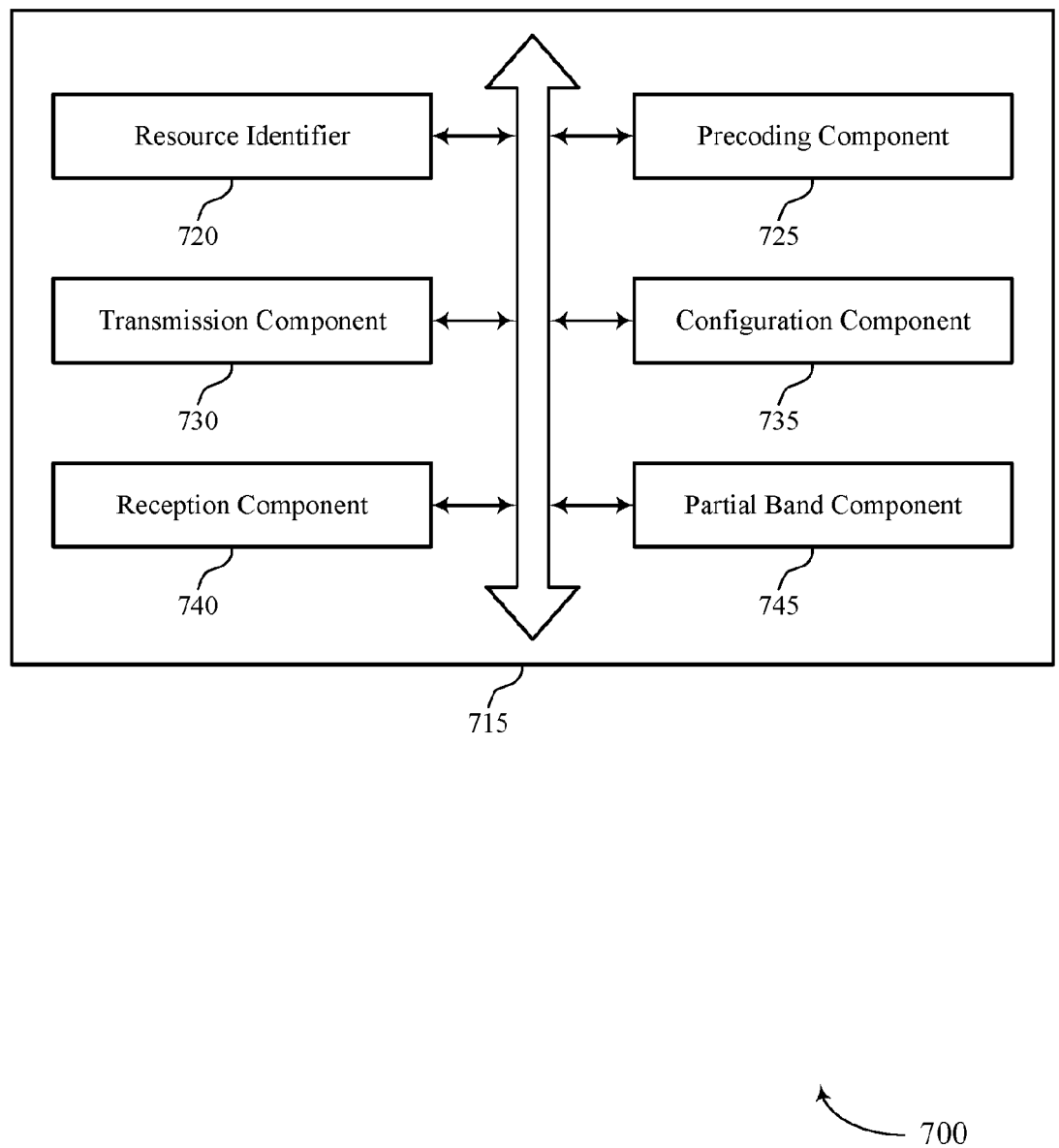

FIG. 7 shows a block diagram 700 of a base station communications manager 715 that supports partial band configuration for channel state information in accordance with aspects of the present disclosure. The base station communications manager 715 may be an example of aspects of a base station communications manager 515, a base station communications manager 615, or a base station communications manager 815 described with reference to FIGS. 5, 6, and 8. The base station communications manager 715 may include resource identifier 720, precoding component 725, transmission component 730, configuration component 735, reception component 740, and partial band component 745. Each of these modules may communicate, directly or indirectly, with one another (e.g., via one or more buses).

Resource identifier 720 may identify a CSI-RS resource set for transmission of multiple CSI-RSs to a UE, where the CSI-RS resource set may have one or more CSI-RS resources, and each CSI-RS resource of the CSI-RS resource set is partitioned according to at least a first non-consecutive partial band and a second non-consecutive partial band in a frequency domain, time domain, or a combination thereof.

Precoding component 725 may precode, according to a first partial band configuration, a first CSI-RS for transmission over a first resource subset of a CSI-RS resource associated with the first non-consecutive partial band and may precode, according to a second partial band configuration, a second CSI-RS for transmission over a second resource subset of a CSI-RS resource associated with the second non-consecutive partial band. In some cases, the first CSI-RS may be precoded according to a first precoder configuration, and the second CSI-RS may be precoded according to a second precoder configuration. In some examples, the first resource subset may span a time interval different from the second resource subset. In some aspects, a first cycling granularity for precoding the first non-consecutive partial band may be equal to or different from a second cycling granularity for precoding the second non-consecutive partial band. In some instances, the first cycling granularity may be a parameter of the first partial band configuration, and the second cycling granularity may be a parameter of the second partial band configuration.

Transmission component 730 may transmit, to the UE, the precoded first CSI-RS over the first resource subset and the precoded second CSI-RS using the second resource subset. In some cases, the transmission of the precoded first CSI-RS over the first resource subset may occur at a different time than the transmission of the precoded second CSI-RS over the second non-consecutive partial band. In some examples, transmitting the precoded first CSI-RS over the first resource subset may include transmitting the precoded first CSI-RS using a part or all of the antenna ports in a set of antenna ports. In some instances, transmitting the precoded second CSI-RS over the second resource subset may include transmitting the precoded second CSI-RS using a part or all of the antenna ports in the set of antenna ports.

Configuration component 735 may identify a total number of precoder configurations for transmission of multiple CSI-RSs in a CSI-RS resource, where the CSI-RS resource is partitioned into a set non-consecutive partial bands based on the total number of precoder configurations.

Reception component 740 may receive a channel feedback message from the UE, where one or both of precoding the first CSI-RS or precoding the second CSI-RS is based on the channel feedback message. In some cases, the channel feedback message may indicate at least one of one or more CRI, a precoding matrix indicator, a precoding type indicator, an RI, a CQI, or a combination thereof.

Partial band component 745 may transmit one or both of the first partial band configuration or the second partial band configuration to a set of UEs including the UE. In some cases, the transmission of one or both of the first partial band configuration and the second partial band configuration may be via an RRC message, MAC CE, or via DCI. In some cases, the transmission the first partial band configuration and the second partial band configuration may be individually or jointly encoded in DCI. In some examples, a format of the DCI may correspond to one of a special DCI format or a CSI-RS DCI format. In some instances, the DCI may be one of UE-specific or group-specific.

Figure 8:
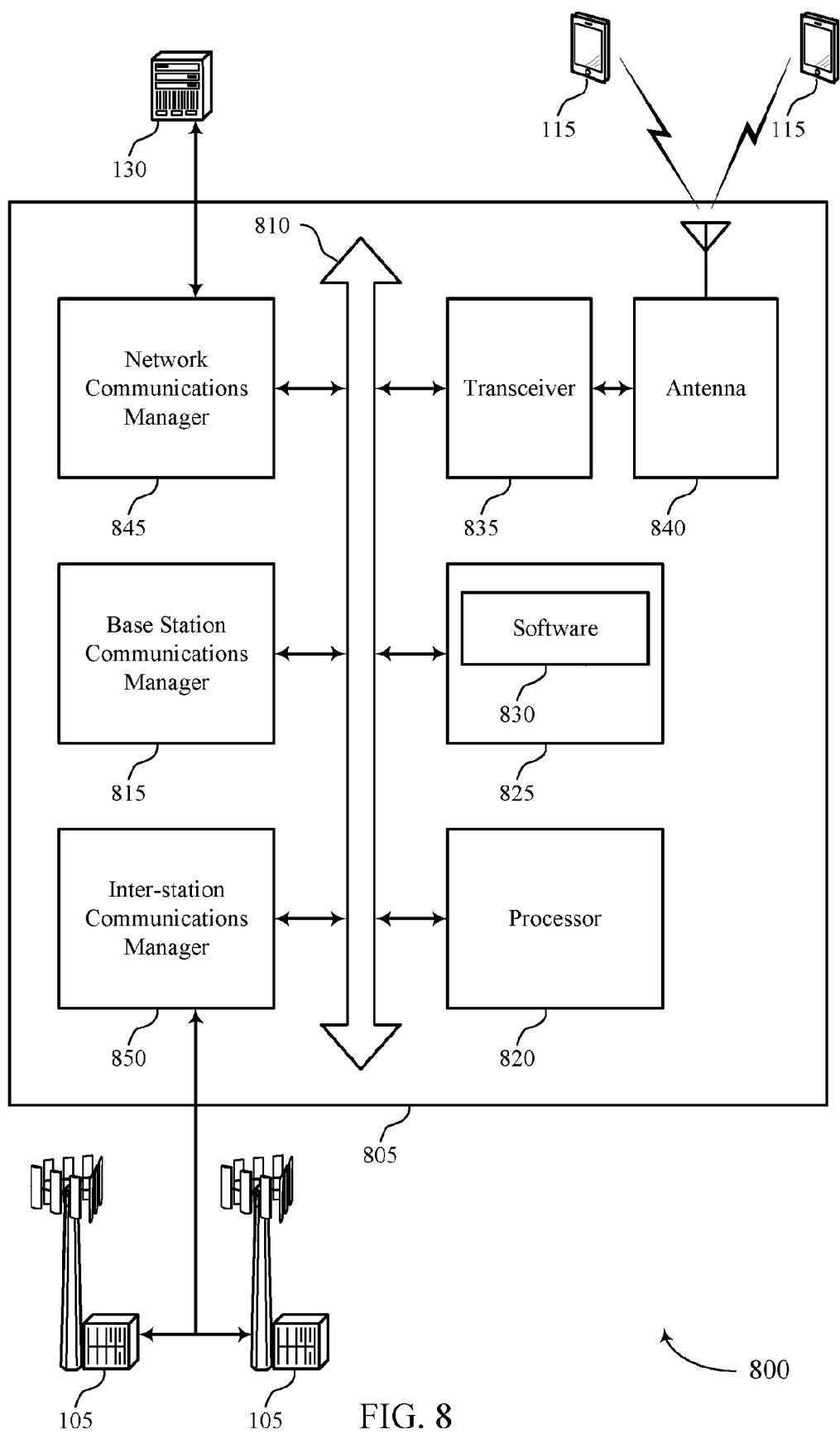
FIG. 8 illustrates a block diagram of a system including a base station that supports partial band configuration for CSI in accordance with aspects of the present disclosure.

FIG. 8 shows a diagram of a system 800 including a device 805 that supports partial band configuration for channel state information in accordance with aspects of the present disclosure. Device 805 may be an example of or include the components of wireless device 505, wireless device 605, or a base station 105 as described above, e.g., with reference to FIGS. 5 and 6. Device 805 may include components for bi-directional voice and data communications including components for transmitting and receiving communications, including base station communications manager 815, processor 820, memory 825, software 830, transceiver 835, antenna 840, network communications manager 845, and inter-station communications manager 850. These components may be in electronic communication via one or more buses (e.g., bus 810). Device 805 may communicate wirelessly with one or more UEs 115.

Processor 820 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 820 may be configured to operate a memory array using a memory controller. In other cases, a memory controller may be integrated into processor 820. Processor 820 may be configured to execute computer-readable instructions stored in a memory to perform various functions (e.g., functions or tasks supporting partial band configuration for channel state information).

Memory 825 may include random access memory (RAM) and read only memory (ROM). The memory 825 may store computer-readable, computer-executable software 830 including instructions that, when executed, cause the processor to perform various functions described herein. In some cases, the memory 825 may contain, among other things, a basic input/output system (BIOS) which may control basic hardware or software operation such as the interaction with peripheral components or devices.

Software 830 may include code to implement aspects of the present disclosure, including code to support partial band configuration for channel state information. Software 830 may be stored in a non-transitory computer-readable medium such as system memory or other memory. In some cases, the software 830 may not be directly executable by the processor but may cause a computer (e.g., when compiled and executed) to perform functions described herein.

Transceiver 835 may communicate bi-directionally, via one or more antennas, wired, or wireless links as described above. For example, the transceiver 835 may represent a wireless transceiver and may communicate bi-directionally with another wireless transceiver. The transceiver 835 may also include a modem to modulate the packets and provide the modulated packets to the antennas for transmission, and to demodulate packets received from the antennas.

In some cases, the wireless device may include a single antenna 840. However, in some cases the device may have more than one antenna 840, which may be capable of concurrently transmitting or receiving multiple wireless transmissions.

Network communications manager 845 may manage communications with the core network (e.g., via one or more wired backhaul links). For example, the network communications manager 845 may manage the transfer of data communications for client devices, such as one or more UEs 115.

Inter-station communications manager 850 may manage communications with other base station 105, and may include a controller or scheduler for controlling communications with UEs 115 in cooperation with other base stations 105. For example, the inter-station communications manager 850 may coordinate scheduling for transmissions to UEs 115 for various interference mitigation techniques such as beamforming or joint transmission. In some examples, inter-station communications manager 850 may provide an X2 interface within an LTE/LTE-A wireless communication network technology to provide communication between base stations 105.

Figure 9:
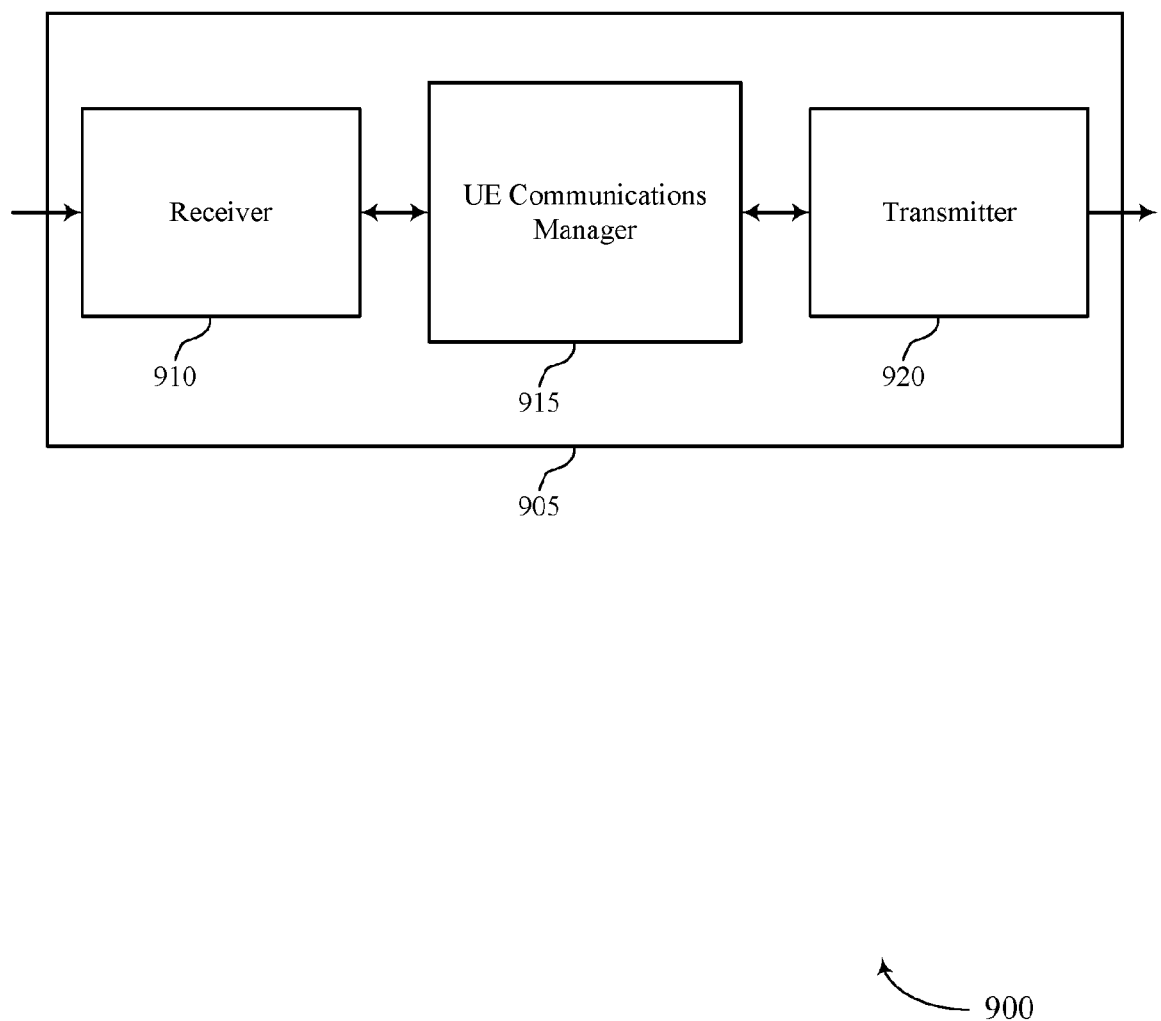
FIGS. 9 through 11 show block diagrams of a device that supports partial band configuration for CSI in accordance with aspects of the present disclosure.

FIG. 9 shows a block diagram 900 of a wireless device 905 that supports partial band configuration for channel state information in accordance with aspects of the present disclosure. Wireless device 905 may be an example of aspects of a UE 115 as described herein. Wireless device 905 may include receiver 910, UE communications manager 915, and transmitter 920. Wireless device 905 may also include a processor. Each of these components may be in communication with one another (e.g., via one or more buses).

Receiver 910 may receive information such as packets, user data, or control information associated with various information channels (e.g., control channels, data channels, and information related to partial band configuration for channel state information, etc.). Information may be passed on to other components of the device. The receiver 910 may be an example of aspects of the transceiver 1235 described with reference to FIG. 12. The receiver 910 may utilize a single antenna or a set of antennas.

UE communications manager 915 may be an example of aspects of the UE communications manager 1215 described with reference to FIG. 12.

UE communications manager 915 and/or at least some of its various sub-components may be implemented in hardware, software executed by a processor, firmware, or any combination thereof. If implemented in software executed by a processor, the functions of the UE communications manager 915 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure.

The UE communications manager 915 and/or at least some of its various sub-components may be physically located at various positions, including being distributed such that portions of functions are implemented at different physical locations by one or more physical devices. In some examples, UE communications manager 915 and/or at least some of its various sub-components may be a separate and distinct component in accordance with various aspects of the present disclosure. In other examples, UE communications manager 915 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

UE communications manager 915 may receive, from a base station, a first CSI-RS over a first resource subset of a CSI-RS resource associated with a first non-consecutive partial band, where the first CSI-RS is precoded according to a first partial band configuration. UE communications manager 915 may receive a second CSI-RS over a second resource subset of the CSI-RS resource associated with a second non-consecutive partial band, where the second CSI-RS is precoded according to a second partial band configuration. UE communications manager 915 may determine, based on the first and second CSI-RSs, one or more channel state parameters for the CSI-RS resource, and transmit, to the base station, a feedback message that indicates the channel state parameters. The CSI-RS resource may include one CSI-RS resource of a CSI-RS resource set.

In some cases, UE communications manager 915 may receive, from the base station, multiple CSI-RS resources from the CSI-RS resource set, where each CSI-RS resource is partitioned according to at least a first non-consecutive partial band and a second non-consecutive partial band. At least two CSI-RS resources may differ by at least a number of partial bands, a time duration for each partial band, a cycling granularity for each partial band, a number of CSI-RS ports for each partial band, precoder used for each partial band, or any combination thereof. Further, UE communications manager 915 may receive, from the base station, a CSI-RS resource set configuration, where the CSI-RS resource set configuration includes at least one of a number of CSI-RS resources of the CSI-RS resource set, a number of partial bands in each CSI-RS resource, a time duration for each partial band, a cycling granularity for each partial band, a number of CSI-RS ports for each partial band, or a combination thereof. The configuration may be included in an RRC message, MAC CE, or in DCI. The feedback message may be generated based on a measurement and computation of each CSI-RS resource.

Transmitter 920 may transmit signals generated by other components of the device. In some examples, the transmitter 920 may be collocated with a receiver 910 in a transceiver module. For example, the transmitter 920 may be an example of aspects of the transceiver 1235 described with reference to FIG. 12. The transmitter 920 may utilize a single antenna or a set of antennas.

Figure 10:
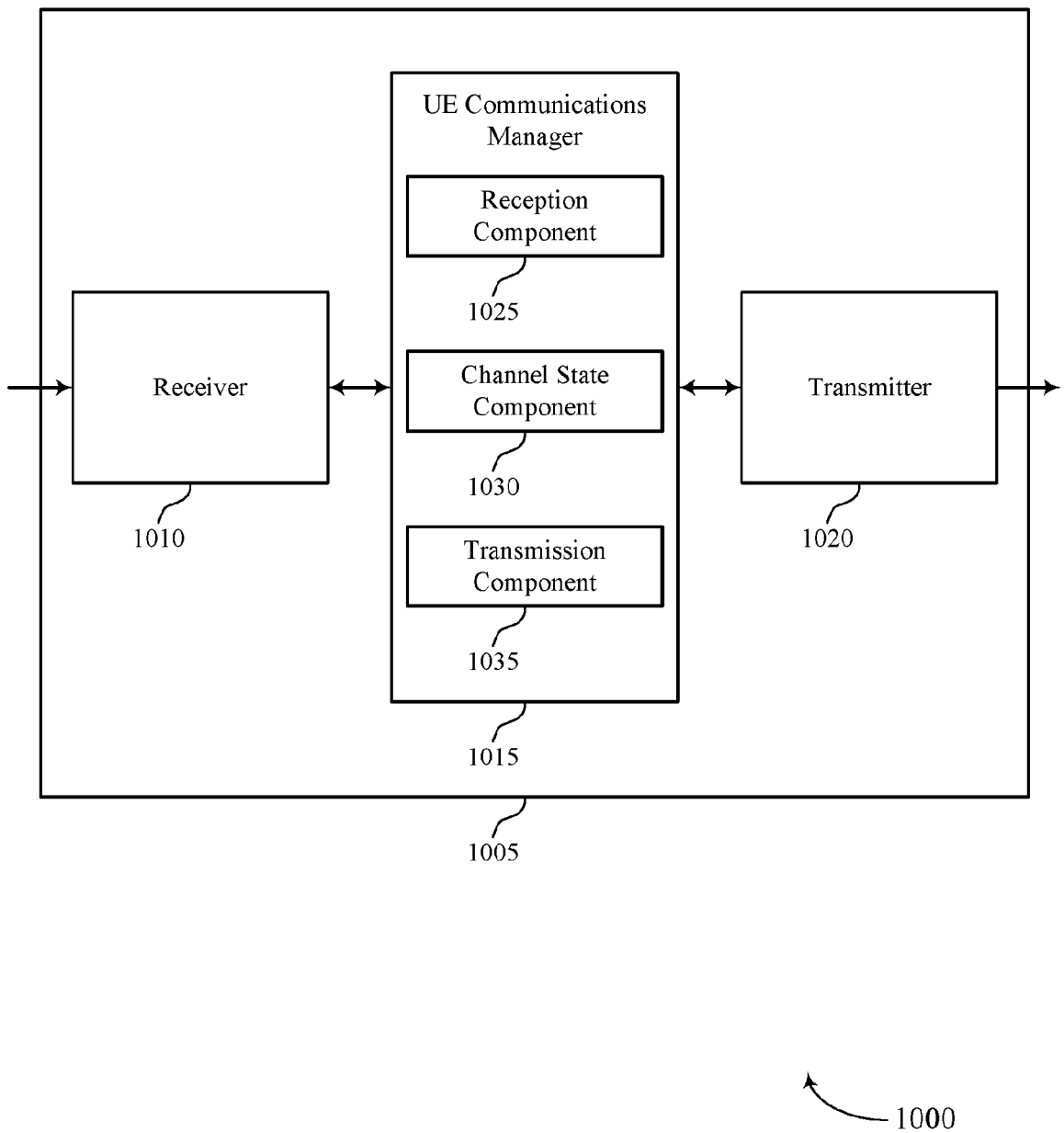

FIG. 10 shows a block diagram 1000 of a wireless device 1005 that supports partial band configuration for channel state information in accordance with aspects of the present disclosure. Wireless device 1005 may be an example of aspects of a wireless device 905 or a UE 115 as described with reference to FIG. 9. Wireless device 1005 may include receiver 1010, UE communications manager 1015, and transmitter 1020. Wireless device 1005 may also include a processor. Each of these components may be in communication with one another (e.g., via one or more buses).

Receiver 1010 may receive information such as packets, user data, or control information associated with various information channels (e.g., control channels, data channels, and information related to partial band configuration for channel state information, etc.). Information may be passed on to other components of the device. The receiver 1010 may be an example of aspects of the transceiver 1235 described with reference to FIG. 12. The receiver 1010 may utilize a single antenna or a set of antennas.

UE communications manager 1015 may be an example of aspects of the UE communications manager 1215 described with reference to FIG. 12. UE communications manager 1015 may also include reception component 1025, channel state component 1030, and transmission component 1035.

Reception component 1025 may receive, from a base station, a first CSI-RS over a first resource subset of a CSI-RS resource associated with a first non-consecutive partial band, where the first CSI-RS is precoded according to a first partial band configuration, and may receive a second CSI-RS over a second resource subset of the CSI-RS resource set associated with a second non-consecutive partial band, where the second CSI-RS is precoded according to a second partial band configuration. The CSI-RS resource may include one CSI-RS resource of a CSI-RS resource set.

In some cases, reception component 1025 may receive, from the base station, multiple CSI-RS resources from the CSI-RS resource set, where each CSI-RS resource is partitioned according to at least a first non-consecutive partial band and a second non-consecutive partial band. At least two CSI-RS resources may differ by at least a number of partial bands, a time duration for each partial band, a cycling granularity for each partial band, a number of CSI-RS ports for each partial band, precoder used for each partial band, or any combination thereof. Further, reception component 1025 may receive, from the base station, a CSI-RS resource set configuration, where the CSI-RS resource set configuration includes at least one of a number of CSI-RS resources of the CSI-RS resource set, a number of partial bands in each CSI-RS resource, a time duration for each partial band, a cycling granularity for each partial band, a number of CSI-RS ports for each partial band, or a combination thereof. The configuration may be included in a RRC message, MAC CE, or in DCI.

Channel state component 1030 may determine, based on the first and second CSI-RSs, one or more channel state parameters for the CSI-RS resource. In some cases, the one or more channel state parameters may include at least one of one or more CRI, a precoding matrix indicator, a precoding type indicator, an RI, a CQI, or a combination thereof.

Transmission component 1035 may transmit, to the base station, a feedback message that indicates the channel state parameter.

Transmitter 1020 may transmit signals generated by other components of the device. In some examples, the transmitter 1020 may be collocated with a receiver 1010 in a transceiver module. For example, the transmitter 1020 may be an example of aspects of the transceiver 1235 described with reference to FIG. 12. The transmitter 1020 may utilize a single antenna or a set of antennas.

Figure 11:
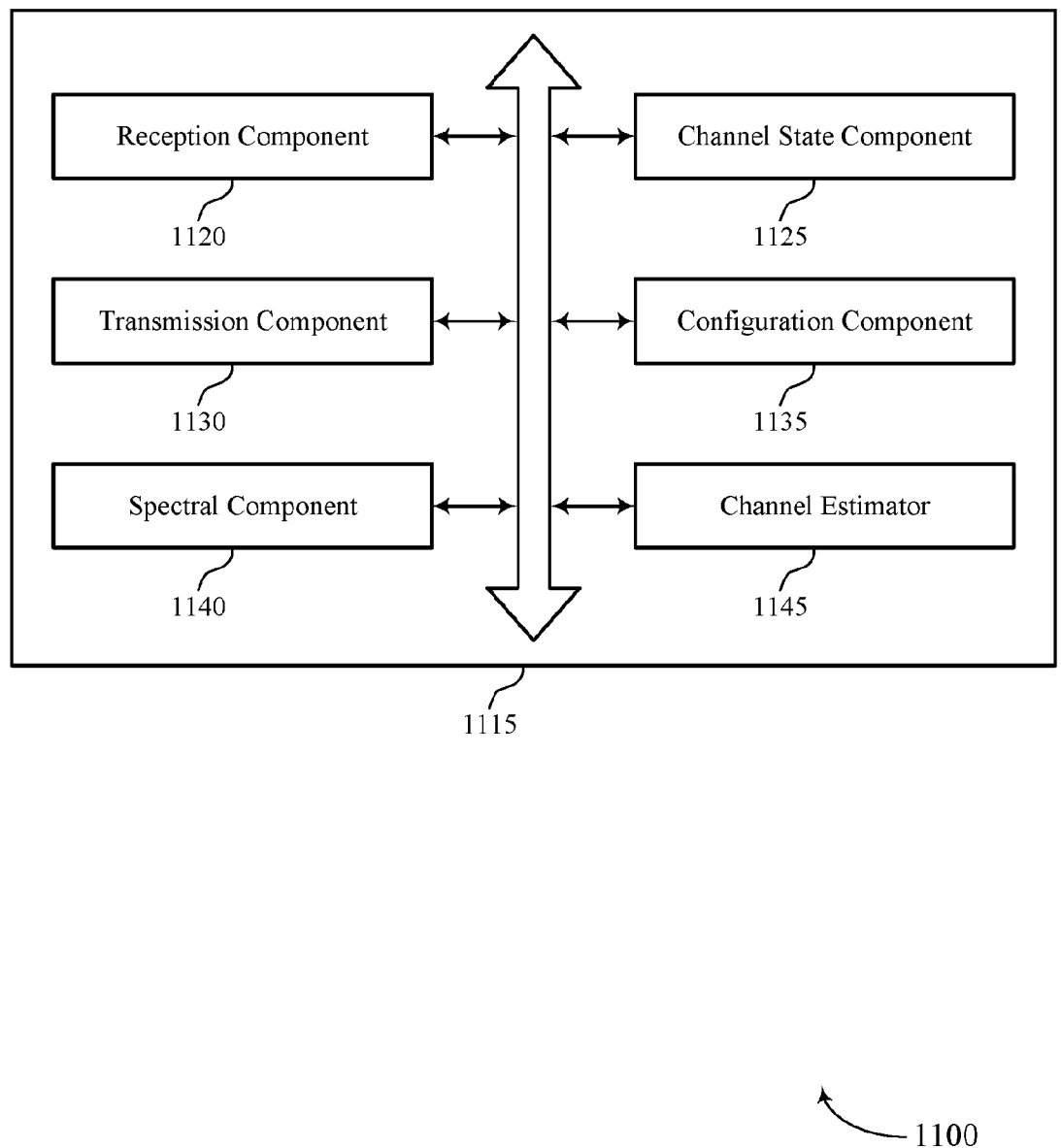

FIG. 11 shows a block diagram 1100 of a UE communications manager 1115 that supports partial band configuration for channel state information in accordance with aspects of the present disclosure. The UE communications manager 1115 may be an example of aspects of a UE communications manager 1215 described with reference to FIGS. 9, 10, and 12. The UE communications manager 1115 may include reception component 1120, channel state component 1125, transmission component 1130, configuration component 1135, spectral component 1140, and channel estimator 1145. Each of these modules may communicate, directly or indirectly, with one another (e.g., via one or more buses).

Reception component 1120 may receive, from a base station, a first CSI-RS over a first resource subset of a CSI-RS resource associated with a first non-consecutive partial band, where the first CSI-RS is precoded according to a first partial band configuration, and may receive a second CSI-RS over a second resource subset of the CSI-RS resource associated with a second non-consecutive partial band, where the second CSI-RS is precoded according to a second partial band configuration. The CSI-RS resource may include one CSI-RS resource of a CSI-RS resource set.

In some cases, reception component 1120 may receive, from the base station, multiple CSI-RS resources from the CSI-RS resource set, where each CSI-RS resource is partitioned according to at least a first non-consecutive partial band and a second non-consecutive partial band. At least two CSI-RS resources may differ by at least a number of partial bands, a time duration for each partial band, a cycling granularity for each partial band, a number of CSI-RS ports for each partial band, precoder used for each partial band, or any combination thereof. Further, the reception component 1120 may receive, from the base station, a CSI-RS resource set configuration, where the CSI-RS resource set configuration includes at least one of a number of CSI-RS resources of the CSI-RS resource set, a number of partial bands in each CSI-RS resource, a time duration for each partial band, a cycling granularity for each partial band, a number of CSI-RS ports for each partial band, or a combination thereof. The configuration may be included in an RRC message, MAC CE, or in DCI.

Channel state component 1125 may determine, based on the first and second CSI-RSs, one or more channel state parameters for the CSI-RS resource. In some examples, the one or more channel state parameters may include at least one of one or more CRI, a precoding matrix indicator, a precoding type indicator, an RI, a CQI, or a combination thereof.

Transmission component 1130 may transmit, to the base station, a feedback message that indicates the channel state parameter.

Configuration component 1135 may receive, from the base station, an indication of one or both of the first partial band configuration or the second partial band configuration. In some cases, the indication may be received via an RRC message, MAC CE, or via DCI. In some examples, the first partial band configuration may indicate at least one of the first resource subset, a first cycling granularity for the first non-consecutive partial band, a first time interval for the first CSI-RS, a first number of ports associated with transmission of the first CSI-RS, or a combination thereof. In some aspects, the second partial band configuration may indicate at least one of the second resource subset, a second cycling granularity for the second non-consecutive partial band, a second time interval for the second CSI-RS, a second number of ports associated with transmission of the second CSI-RS, or a combination thereof. In some instances, the first cycling granularity may indicate a number of RBs of the first resource subset. In some cases, the second cycling granularity may indicate a number of RBs of the second resource subset.

Spectral component 1140 may calculate a first spectral efficiency for the first C SIRS based on a first CSI-RS port to data precoder mapping and may calculate a second spectral efficiency for the second CSI-RS based on a second CSI-RS port to data precoder mapping. In some cases, one or both of the first and second CSI-RS port to data precoder mappings may be based in part on a co-phase vector or Alamouti encoding associated with a set of REs corresponding to a respective resource subset of the first resource subset and the second resource sub set.

Channel estimator 1145 may estimate a first effective channel for the first non-consecutive partial band based on a first set of RBs of the first resource subset and may estimate a second effective channel for the second non-consecutive partial band based on a second set of RBs of the second resource subset.

Figure 12:
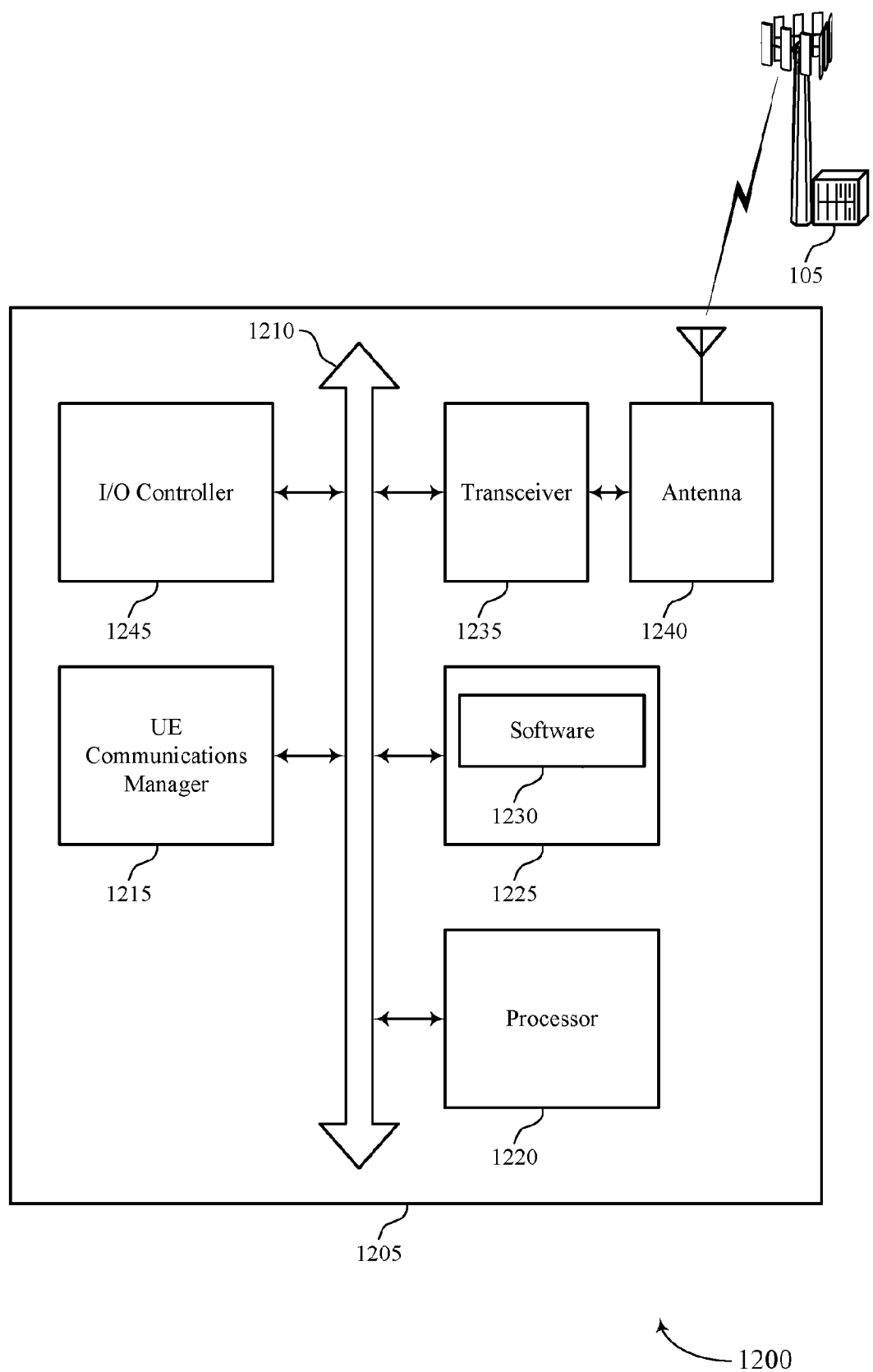
FIG. 12 illustrates a block diagram of a system including a user equipment (UE) that supports partial band configuration for CSI in accordance with aspects of the present disclosure.

FIG. 12 shows a diagram of a system 1200 including a device 1205 that supports partial band configuration for channel state information in accordance with aspects of the present disclosure. Device 1205 may be an example of or include the components of UE 115 as described above, e.g., with reference to FIG. 1. Device 1205 may include components for bi-directional voice and data communications including components for transmitting and receiving communications, including UE communications manager 1215, processor 1220, memory 1225, software 1230, transceiver 1235, antenna 1240, and I/O controller 1245. These components may be in electronic communication via one or more buses (e.g., bus 1210). Device 1205 may communicate wirelessly with one or more base stations 105.

Processor 1220 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1220 may be configured to operate a memory array using a memory controller. In other cases, a memory controller may be integrated into processor 1220. Processor 1220 may be configured to execute computer-readable instructions stored in a memory to perform various functions (e.g., functions or tasks supporting partial band configuration for channel state information).

Memory 1225 may include RAM and ROM. The memory 1225 may store computer-readable, computer-executable software 1230 including instructions that, when executed, cause the processor to perform various functions described herein. In some cases, the memory 1225 may contain, among other things, a BIOS which may control basic hardware or software operation such as the interaction with peripheral components or devices.

Software 1230 may include code to implement aspects of the present disclosure, including code to support partial band configuration for channel state information. Software 1230 may be stored in a non-transitory computer-readable medium such as system memory or other memory. In some cases, the software 1230 may not be directly executable by the processor but may cause a computer (e.g., when compiled and executed) to perform functions described herein.

Transceiver 1235 may communicate bi-directionally, via one or more antennas, wired, or wireless links as described above. For example, the transceiver 1235 may represent a wireless transceiver and may communicate bi-directionally with another wireless transceiver. The transceiver 1235 may also include a modem to modulate the packets and provide the modulated packets to the antennas for transmission, and to demodulate packets received from the antennas.

In some cases, the wireless device may include a single antenna 1240. However, in some cases the device may have more than one antenna 1240, which may be capable of concurrently transmitting or receiving multiple wireless transmissions.

I/O controller 1245 may manage input and output signals for device 1205. I/O controller 1245 may also manage peripherals not integrated into device 1205. In some cases, I/O controller 1245 may represent a physical connection or port to an external peripheral. In some cases, I/O controller 1245 may utilize an operating system such as iOS®, ANDROID®, MS-DOS®, MS-WINDOWS®, OS/2®, UNIX®, LINUX®, or another known operating system. In other cases, I/O controller 1245 may represent or interact with a modem, a keyboard, a mouse, a touchscreen, or a similar device. In some cases, I/O controller 1245 may be implemented as part of a processor. In some cases, a user may interact with device 1205 via I/O controller 1245 or via hardware components controlled by I/O controller 1245.

Figure 13:
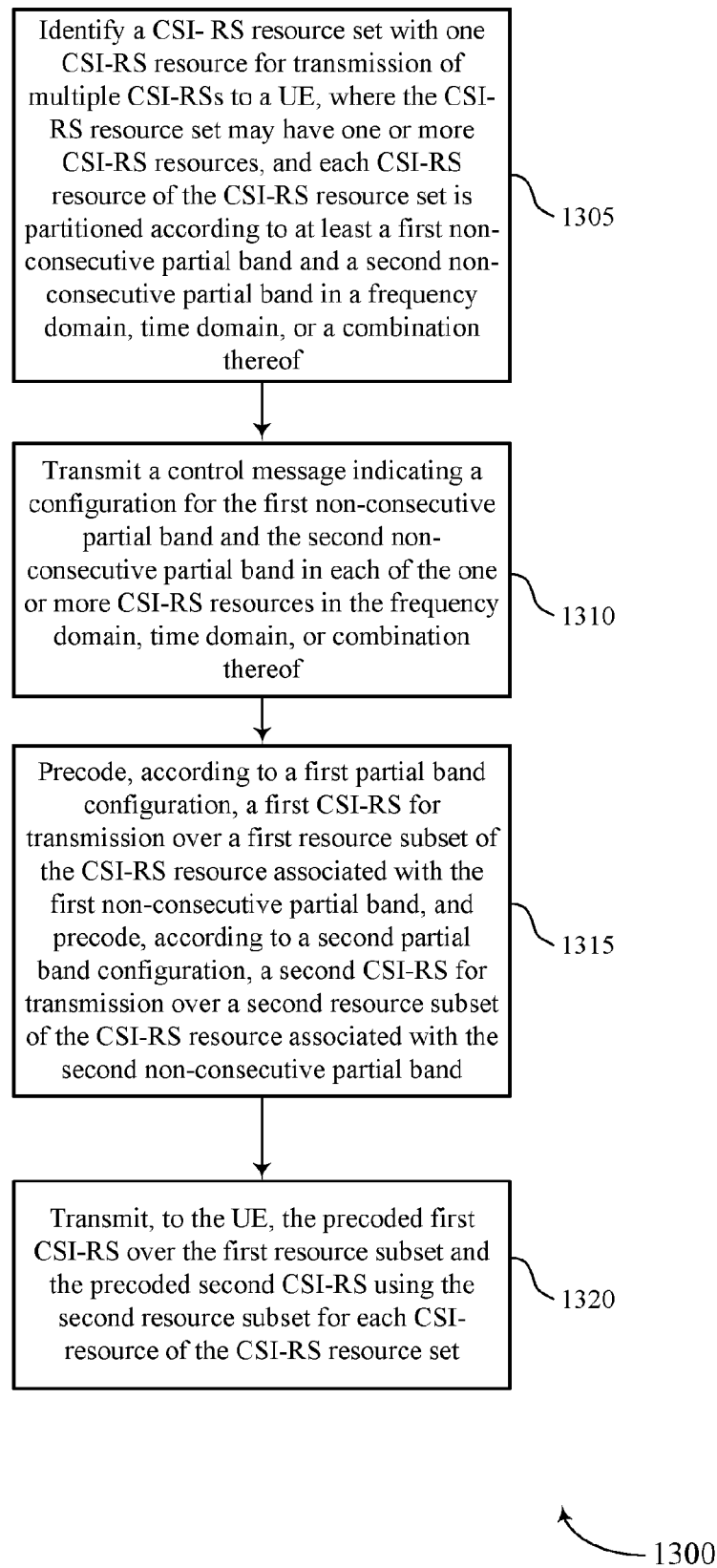
FIGS. 13 and 14 illustrate methods for partial band configuration for CSI in accordance with aspects of the present disclosure.

FIG. 13 shows a flowchart illustrating a method 1300 for partial band configuration for channel state information in accordance with aspects of the present disclosure. The operations of method 1300 may be implemented by a base station 105 or its components as described herein. For example, the operations of method 1300 may be performed by a base station communications manager as described with reference to FIGS. 5 through 8. In some examples, a base station 105 may execute a set of codes to control the functional elements of the device to perform the functions described below. Additionally or alternatively, the base station 105 may perform aspects of the functions described below using special-purpose hardware.

At 1305, the base station 105 may identify a CSI-RS resource set for transmission of multiple CSI-RSs to a UE, where the CSI-RS resource set may have one or more CSI-RS resources, and each CSI-RS resource of the CSI-RS resource set is partitioned according to at least a first non-consecutive partial band and a second non-consecutive partial band in a frequency domain, time domain, or a combination thereof. The operations of block 1305 may be performed according to the methods described herein. In certain examples, aspects of the operations of 1305 may be performed by a resource identifier as described with reference to FIGS. 5 through 8.

At 1310, the base station may transmit a control message indicating a configuration for the first non-consecutive partial band and the second non-consecutive partial band in the frequency domain, time domain, or a combination thereof. The operations of 1310 may be performed according to the methods described herein. In certain examples, aspects of the operations of 1310 may be performed by a resource identifier as described with reference to FIGS. 5 through 8.

At 1315, the base station 105 may precode, according to a first partial band configuration, a first CSI-RS for transmission over a first resource subset of the CSI-RS resource associated with the first non-consecutive partial band. The operations of 1315 may be performed according to the methods described herein. In certain examples, aspects of the operations of 1315 may be performed by a precoding component as described with reference to FIGS. 5 through 8. Additionally, the base station 105 may precode, according to a second partial band configuration, a second CSI-RS for transmission over a second resource subset of the CSI-RS resource set associated with the second non-consecutive partial band. The operations of 1315 may be performed according to the methods described herein. In certain examples, aspects of the operations of 1315 may be performed by a precoding component as described with reference to FIGS. 5 through 8.

At 1320, the base station 105 may transmit, to the UE, the precoded first CSI-RS over the first resource subset and the precoded second CSI-RS using the second resource subset. The operations of 1320 may be performed according to the methods described herein. In certain examples, aspects of the operations of 1320 may be performed by a transmission component as described with reference to FIGS. 5 through 8.

Figure 14:
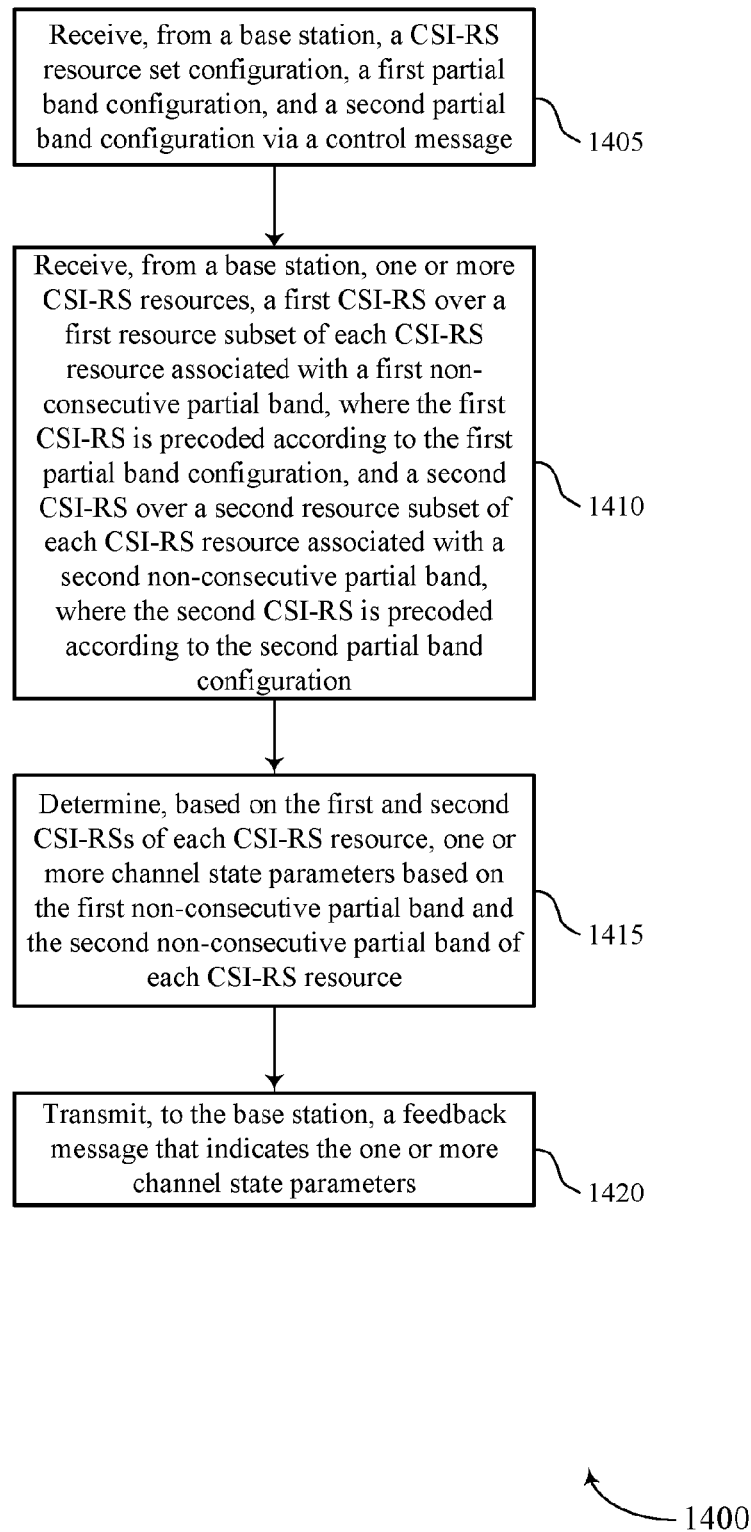

FIG. 14 shows a flowchart illustrating a method 1400 for partial band configuration for channel state information in accordance with aspects of the present disclosure. The operations of method 1400 may be implemented by a UE 115 or its components as described herein. For example, the operations of method 1400 may be performed by a UE communications manager as described with reference to FIGS. 9 through 12. In some examples, a UE 115 may execute a set of codes to control the functional elements of the device to perform the functions described below. Additionally or alternatively, the UE 115 may perform aspects of the functions described below using special-purpose hardware.

At 1405, the UE 115 may receive, from a base station, a first partial band configuration and a second partial band configuration via a control message. The operations of 1405 may be performed according to the methods described herein. In certain examples, aspects of the operations of 1405 may be performed by a reception component as described with reference to FIGS. 9 through 12.

At 1410, the UE 115 may receive, from a base station, a first CSI-RS over a first resource subset of a CSI-RS resource associated with a first non-consecutive partial band, where the first CSI-RS is precoded according to the first partial band configuration. The operations of 1410 may be performed according to the methods described herein. In certain examples, aspects of the operations of 1410 may be performed by a reception component as described with reference to FIGS. 9 through 12. Additionally, the UE 115 may receive a second CSI-RS over a second resource subset of the CSI-RS resource associated with a second non-consecutive partial band, where the second CSI-RS is precoded according to the second partial band configuration. The operations of 1410 may be performed according to the methods described herein. In certain examples, aspects of the operations of 1410 may be performed by a reception component as described with reference to FIGS. 9 through 12.

At 1415, the UE 115 may determine, based on the first and second CSI-RSs, one or more channel state parameters for the CSI-RS resource. The operations of 1415 may be performed according to the methods described herein. In certain examples, aspects of the operations of 1415 may be performed by a channel state component as described with reference to FIGS. 9 through 12.

At 1420, the UE 115 may transmit, to the base station, a feedback message that indicates the channel state parameters. The operations of 1420 may be performed according to the methods described herein. In certain examples, aspects of the operations of 1420 may be performed by a transmission component as described with reference to FIGS. 9 through 12.

It should be noted that the methods described above describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A code division multiple access (CDMA) system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE and LTE-A are releases of UMTS that use E-UTRA. UTRA, E-UTRA, UMTS, LTE, LTE-A, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE or an NR system may be described for purposes of example, and LTE or NR terminology may be used in much of the description, the techniques described herein are applicable beyond LTE or NR applications.

In LTE/LTE-A networks, including such networks described herein, the term evolved node B (eNB) may be generally used to describe the base stations. The wireless communications system or systems described herein may include a heterogeneous LTE/LTE-A or NR network in which different types of eNBs provide coverage for various geographical regions. For example, each eNB, next generation NodeB (gNB), or base station may provide communication coverage for a macro cell, a small cell, or other types of cell. The term "cell" may be used to describe a base station, a carrier or component carrier associated with a base station, or a coverage area (e.g., sector, etc.) of a carrier or base station, depending on context.

Base stations may include or may be referred to by those skilled in the art as a base transceiver station, a radio base station, an access point, a radio transceiver, a NodeB, eNodeB (eNB), gNB, Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, gNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers).

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, wireless communications system 100 and 200 of FIGS. 1 and 2—may include one or more carriers, where each carrier may be a signal made up of multiple sub-carriers (e.g., waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
    receiving, from a base station, a first channel state information reference signal (CSI-RS) over a first resource subset of a CSI-RS resource associated with a first non-consecutive partial band, wherein the first CSI-RS is precoded according to a first partial band configuration;
    receiving a second CSI-RS over a second resource subset of the CSI-RS resource associated with a second non-consecutive partial band, wherein the second CSI-RS is precoded according to a second partial band configuration;
    receiving, from the base station, multiple CSI-RS resources from a CSI-RS resource set, wherein each CSI-RS resource is partitioned according to at least the first non-consecutive partial band and the second non-consecutive partial band;
    determining, based at least in part on the first and second CSI-RSs, one or more channel state parameters based at least in part on the first non-consecutive partial band and the second non-consecutive partial band; and
    transmitting, to the base station, a feedback message that indicates the one or more channel state parameters.

2. The method of claim 1, wherein determining the one or more channel state parameters comprises:
    determining one or more channel state parameters for the CSI-RS resource corresponding to the first and second non-consecutive partial bands based at least in part on a channel estimation of the first and second non-consecutive partial bands.

3. The method of claim 1, further comprising:
    receiving, from the base station, an indication of one or both of the first partial band configuration or the second partial band configuration, wherein the indication is received via a radio resource control (RRC) message, medium access control (MAC) channel element (CE), or downlink control information (DCI).

4. The method of claim 1, wherein:
    the first partial band configuration indicates at least one of the first resource subset, a first cycling granularity for the first non-consecutive partial band, a first time interval for the first CSI-RS, a first number of ports associated with transmission of the first CSI-RS, or a combination thereof; and
    the second partial band configuration indicates at least one of the second resource subset, a second cycling granularity for the second non-consecutive partial band, a second time interval for the second CSI-RS, a second number of ports associated with transmission of the second CSI-RS, or a combination thereof.

5. The method of claim 4, wherein:
    the first cycling granularity indicates a number of consecutive resource blocks (RBs) in a frequency domain, time domain, or a combination thereof of the first resource subset; and
    the second cycling granularity indicates a number of consecutive resource blocks (RBs) in a frequency domain, a time domain, or a combination thereof of the second resource subset.

6. The method of claim 1, further comprising:
    estimating a first effective channel for the first non-consecutive partial band based at least in part on a first set of RBs of the first resource subset; and
    estimating a second effective channel for the second non-consecutive partial band based at least in part on a second set of RBs of the second resource subset, wherein the second non-consecutive partial band comprises a non-consecutive partial band from the first non-consecutive partial band that is non-contiguous in a frequency domain, time domain, or a combination thereof.

7. The method of claim 6, further comprising:
    selecting a channel state information resource indicator (CRI) based at least in part on the first and second effective channels, wherein the one or more channel state parameters are determined based at least in part on the CRI, and wherein the one or more channel state parameters comprise at least one of a precoding matrix indicator, a precoding type indicator, a rank indicator, a channel quality indicator, or a combination thereof.

8. The method of claim 1, wherein:
one or both of a first and second CSI-RS port to data precoder mappings is based at least in part on a co-phase vector or Alamouti encoding associated with a set of resource elements (REs) corresponding to a respective resource subset of the first resource subset and the second resource subset.

9. The method of claim 1, further comprising:
receiving, from the base station, a control message indicating that the first partial band configuration and the second partial band configuration have different configuration parameters, wherein at least one configuration parameter of the first partial band configuration or the second partial band configuration is received in a radio resource control (RRC) message, medium access control (MAC) channel element (CE), or in downlink control information (DCI).

10. The method of claim 1, wherein:
the CSI-RS resource comprises one CSI-RS resource of the CSI-RS resource set.

11. The method of claim 1, wherein:
at least two CSI-RS resources are different by at least a number of partial bands, a time duration for each partial band, a cycling granularity for each partial band, a number of CSI-RS ports for each partial band, precoder used for each partial band, or any combination thereof.

12. The method of claim 1, further comprising:
receiving, from the base station, a CSI-RS resource set configuration, wherein the CSI-RS resource set configuration comprises at least one of a number of CSI-RS resources of the CSI-RS resource set, a number of partial bands in each CSI-RS resource, a time duration for each partial band, a cycling granularity for each partial band, a number of CSI-RS ports for each partial band, or a combination thereof, and wherein the CSI-RS resource set configuration is included in a radio resource control (RRC) message, medium access control (MAC) channel element (CE), or in downlink control information (DCI).

13. An apparatus for wireless communication, comprising:
a processor;
memory coupled with the processor; and
instructions stored in the memory and configured, when executed by the processor, to cause the apparatus to:
receive, from a base station, a first channel state information reference signal (CSI-RS) over a first resource subset of a CSI-RS resource associated with a first non-consecutive partial band, wherein the first CSI-RS is precoded according to a first partial band configuration;
receive a second CSI-RS over a second resource subset of the CSI-RS resource associated with a second non-consecutive partial band, wherein the second CSI-RS is precoded according to a second partial band configuration;
receive, from the base station, multiple CSI-RS resources from a CSI-RS resource set, wherein each CSI-RS resource is partitioned according to at least the first non-consecutive partial band and the second non-consecutive partial band;
determine, based at least in part on the first and second CSI-RSs, one or more channel state parameters based at least in part on the first non-consecutive partial band and the second non-consecutive partial band; and
transmit, to the base station, a feedback message that indicates the one or more channel state parameters.

14. The apparatus of claim 13, wherein the instructions to determine the one or more channel state parameters are further executed by the processor to cause the apparatus to:
determine one or more channel state parameters for the CSI-RS resource corresponding to the first and second non-consecutive partial bands based at least in part on a channel estimation of the first and second non-consecutive partial bands.

15. The apparatus of claim 13, wherein the instructions are further executed by the processor to cause the apparatus to:
receive, from the base station, an indication of one or both of the first partial band configuration or the second partial band configuration, wherein the indication is received via a radio resource control (RRC) message, medium access control (MAC) channel element (CE), or downlink control information (DCI).

16. The apparatus of claim 13, wherein:
the first partial band configuration indicates at least one of the first resource subset, a first cycling granularity for the first non-consecutive partial band, a first time interval for the first CSI-RS, a first number of ports associated with transmission of the first CSI-RS, or a combination thereof; and
the second partial band configuration indicates at least one of the second resource subset, a second cycling granularity for the second non-consecutive partial band, a second time interval for the second CSI-RS, a second number of ports associated with transmission of the second CSI-RS, or a combination thereof.

17. The apparatus of claim 16, wherein:
the first cycling granularity indicates a number of consecutive resource blocks (RBs) in a frequency domain, time domain, or a combination thereof of the first resource subset; and
the second cycling granularity indicates a number of consecutive resource blocks (RBs) in a frequency domain, a time domain, or a combination thereof of the second resource subset.

18. The apparatus of claim 13, wherein one or both of a first and second CSI-RS port to data precoder mappings is based at least in part on a co-phase vector or Alamouti encoding associated with a set of resource elements (REs) corresponding to a respective resource subset of the first resource subset and the second resource subset.

19. The apparatus of claim 13, wherein the instructions are further executed by the processor to cause the apparatus to:
estimate a first effective channel for the first non-consecutive partial band based at least in part on a first set of RBs of the first resource subset; and
estimate a second effective channel for the second non-consecutive partial band based at least in part on a second set of RBs of the second resource subset, wherein the second non-consecutive partial band comprises a non-consecutive partial band from the first non-consecutive partial band that is non-consecutive in a frequency domain, time domain, or a combination thereof.

20. The apparatus of claim 19, wherein the instructions are further executed by the processor to cause the apparatus to:
select a channel state information resource indicator (CRI) based at least in part on the first and second effective channels, wherein the one or more channel state parameters are determined based at least in part on the CRI, and wherein the one or more channel state parameters comprise at least one of a precoding matrix indicator, a precoding type indicator, a rank indicator, a channel quality indicator, or a combination thereof.

21. The apparatus of claim 13, wherein the instructions are further executed by the processor to cause the apparatus to:
receive, from the base station, a control message indicating that the first partial band configuration and the second partial band configuration have different configuration parameters, wherein at least one configuration parameter of the first partial band configuration or the second partial band configuration is received in a radio resource control (RRC) message, medium access control (MAC) channel element (CE), or in downlink control information (DCI).

22. The apparatus of claim 13, wherein the CSI-RS resource comprises one CSI-RS resource of the CSI-RS resource set.

23. The apparatus of claim 13, wherein:
at least two CSI-RS resources are different by at least a number of partial bands, a time duration for each partial band, a cycling granularity for each partial band, a number of CSI-RS ports for each partial band, precoder used for each partial band, or any combination thereof.

24. The apparatus of claim 13, wherein the instructions are further executed by the processor to cause the apparatus to:
receive, from the base station, a CSI-RS resource set configuration, wherein the CSI-RS resource set configuration comprises at least one of a number of CSI-RS resources of the CSI-RS resource set, a number of partial bands in each CSI-RS resource, a time duration for each partial band, a cycling granularity for each partial band, a number of CSI-RS ports for each partial band, or a combination thereof, and wherein the CSI-RS resource set configuration is included in a radio resource control (RRC) message, medium access control (MAC) channel element (CE), or in downlink control information (DCI).

25. A non-transitory computer-readable medium storing code for wireless communication, the code comprising instructions executed by a processor to:
receive, from a base station, a first channel state information reference signal (CSI-RS) over a first resource subset of a CSI-RS resource associated with a first non-consecutive partial band, wherein the first CSI-RS is precoded according to a first partial band configuration;
receive a second CSI-RS over a second resource subset of the CSI-RS resource associated with a second non-consecutive partial band, wherein the second CSI-RS is precoded according to a second partial band configuration;
receive, from the base station, multiple CSI-RS resources from a CSI-RS resource set, wherein each CSI-RS resource is partitioned according to at least the first non-consecutive partial band and the second non-consecutive partial band;
determine, based at least in part on the first and second CSI-RSs, one or more channel state parameters based at least in part on the first non-consecutive partial band and the second non-consecutive partial band; and
transmit, to the base station, a feedback message that indicates the one or more channel state parameters.

26. The non-transitory computer-readable medium of claim 25, wherein the instructions to determine the one or more channel state parameters are executed by the processor to:
determine one or more channel state parameters for the CSI-RS resource corresponding to the first and second non-consecutive partial bands based at least in part on a channel estimation of the first and second non-consecutive partial bands.

27. The non-transitory computer-readable medium of claim 25, wherein the instructions are further executed by the processor to:
receive, from the base station, an indication of one or both of the first partial band configuration or the second partial band configuration, wherein the indication is received via a radio resource control (RRC) message, medium access control (MAC) channel element (CE), or downlink control information (DCI).

28. The non-transitory computer-readable medium of claim 25, wherein:
the first partial band configuration indicates at least one of the first resource subset, a first cycling granularity for the first non-consecutive partial band, a first time interval for the first CSI-RS, a first number of ports associated with transmission of the first CSI-RS, or a combination thereof; and
the second partial band configuration indicates at least one of the second resource subset, a second cycling granularity for the second non-consecutive partial band, a second time interval for the second CSI-RS, a second number of ports associated with transmission of the second CSI-RS, or a combination thereof.

* * * * *